US012769888B2

(12) United States Patent
Mahara et al.

(10) Patent No.: US 12,769,888 B2
(45) Date of Patent: Oct. 20, 2026

(54) DATA PROCESSING DEVICE WITH REGISTER STORING SETTING, SECURITY AND COMMUNICATION INFORMATION FOR READ AND WRITE REQUESTS

(71) Applicant: Sony Semiconductor Solutions Corporation, Kanagawa (JP)

(72) Inventors: Kumiko Mahara, Kanagawa (JP); Shota Hasegawa, Saitama (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 260 days.

(21) Appl. No.: 18/712,288

(22) PCT Filed: Oct. 31, 2022

(86) PCT No.: PCT/JP2022/040708
§ 371 (c)(1),
(2) Date: May 22, 2024

(87) PCT Pub. No.: WO2023/119893
PCT Pub. Date: Jun. 29, 2023

(65) Prior Publication Data

US 2026/0147941 A1 May 28, 2026

(30) Foreign Application Priority Data

Dec. 23, 2021 (JP) ................................ 2021-209756

(51) Int. Cl.
*G06F 11/16* (2006.01)
*G06F 11/10* (2006.01)
(Continued)

(52) U.S. Cl.
CPC .......... *G06F 21/71* (2013.01); *G06F 11/1004* (2013.01); *G06F 21/602* (2013.01)

(58) Field of Classification Search
None
See application file for complete search history.

(56) References Cited

U.S. PATENT DOCUMENTS 10,459,849 B1 * 10/2019 Shorb ................. G06F 11/3034
2008/0244161 A1 * 10/2008 Yamada .............. G06F 12/0284
711/E12.001

(Continued)

FOREIGN PATENT DOCUMENTS

CN 109428770 A * 3/2019 ............. G06F 30/34
JP H07175782 A 7/1995

(Continued)

OTHER PUBLICATIONS

International Search Report (PCT/ISA/210), International Application No. PCT/JP2022/040708, dated Dec. 27, 2022.

*Primary Examiner* — Venkat Perungavoor
(74) *Attorney, Agent, or Firm* — Michael Best & Friedrich LLP

(57) ABSTRACT

A data processing device according to the present disclosure includes: a register including, as address regions, a setting region that stores setting information transmitted from a host, a security data region that stores security data for the setting information, and a communication information region that stores communication information with the host; and a communication unit that performs register communication between the host and the register.

16 Claims, 34 Drawing Sheets

(51) Int. Cl.

| | |
|---|---|
| ***G06F 11/36*** | (2025.01) |
| ***G06F 21/60*** | (2013.01) |
| ***G06F 21/71*** | (2013.01) |
| *G06F 11/25* | (2006.01) |
| *G06F 11/30* | (2006.01) |

(56) References Cited

U.S. PATENT DOCUMENTS

| | | | | |
|---|---|---|---|---|
| 2018/0062840 | A1* | 3/2018 | Zou | H04L 9/0869 |
| 2019/0116108 | A1* | 4/2019 | Gibson | G06F 11/3409 |
| 2019/0243651 | A1* | 8/2019 | Venkataramani | G06F 9/3004 |
| 2020/0133877 | A1* | 4/2020 | Walker | G06F 12/1027 |
| 2022/0043606 | A1* | 2/2022 | Lee | G06F 3/0616 |

FOREIGN PATENT DOCUMENTS

| | | | |
|---|---|---|---|
| JP | 2001027877 | A | 1/2001 |
| JP | 2003281077 | A | 10/2003 |
| JP | 2004096666 | A | 3/2004 |
| JP | 2011210037 | A | 10/2011 |
| JP | 2012114773 | A | 6/2012 |
| JP | 2018525866 | A | 9/2018 |
| JP | 2019033368 | A | 2/2019 |
| WO | 2021014125 | A1 | 1/2021 |

* cited by examiner

DATA PROCESSING DEVICE WITH REGISTER STORING SETTING, SECURITY AND COMMUNICATION INFORMATION FOR READ AND WRITE REQUESTS

TECHNICAL FIELD

The present disclosure relates to a data processing device.

BACKGROUND ART

There is a technique that improves security of transmission of image data from a camera coupled to a network (for example, see PTLs 1 and 2). On the other hand, some cameras include a register that stores, for example, various pieces of setting information related to imaging conditions or the like by an image sensor, and various pieces of setting information related to transmission of image data from the image sensor to a host inside the camera.

CITATION LIST

Patent Literature

PTL 1: Japanese Unexamined Patent Application Publication No. 2019-33368 PTL 2: Japanese Unexamined Patent Application Publication (Translation of PCT Application) No. 2018-525866

SUMMARY OF THE INVENTION

It is desired to develop a technique that improves security of register communication between an image sensor and a host inside a camera.

It is desirable to provide a data processing device that makes it possible to improve security.

A data processing device according to an embodiment of the present disclosure includes: a register including, as address regions, a setting region that stores setting information transmitted from a host, a security data region that stores security data for the setting information, and a communication information region that stores communication information with the host; and a communication unit that performs register communication between the host and the register.

The data processing device according to the embodiment of the present disclosure includes, as the address regions of the register in the data processing device, the security data region that stores the security data for the setting information and the communication information region that stores the communication information with the host, and performs the register communication between the data processing device and the host.

BRIEF DESCRIPTION OF DRAWINGS

FIG. 5 is an explanatory diagram illustrating an example of a configuration (a register map) of a register based on the technology according to one embodiment.

FIG. 11 is a block diagram illustrating a specific example of a writing determination unit in the CIS illustrated in FIG. 10.

FIG. 15 is a block diagram illustrating a specific example of a writing determination unit in the CIS illustrated in FIG. 14.

FIG. 24 is a block diagram schematically illustrating a third configuration example of the CIS serving as the data processing device according to one embodiment.

FIG. 26 is a block diagram schematically illustrating a fourth configuration example of the CIS serving as the data processing device according to one embodiment.

FIG. 28 is an explanatory diagram illustrating a modification example of a configuration (a register map) of the register based on the technology according to one embodiment.

MODES FOR CARRYING OUT THE INVENTION

Some embodiments of the present disclosure are described below in detail with reference to the drawings. It is to be noted that the description is given in the following order.

1. Embodiment
1.1 Overall Configuration and Issue of Data Transmission System (FIG. 1 to FIG. 4)
1.2 Safety and Security Technique Based on Technology According to Embodiment (FIG. 5 to FIG. 40)
1.2.1 Overview of Safety and Security Technique
1.2.2 Specific Examples of Safety and Security Technique
1.3 Effects
2. Other Embodiments

1. Embodiment

[1.1 Overall Configuration and Issue of Data Transmission System]

(Overall Configuration Example of Data Transmission System)

Figure 1:
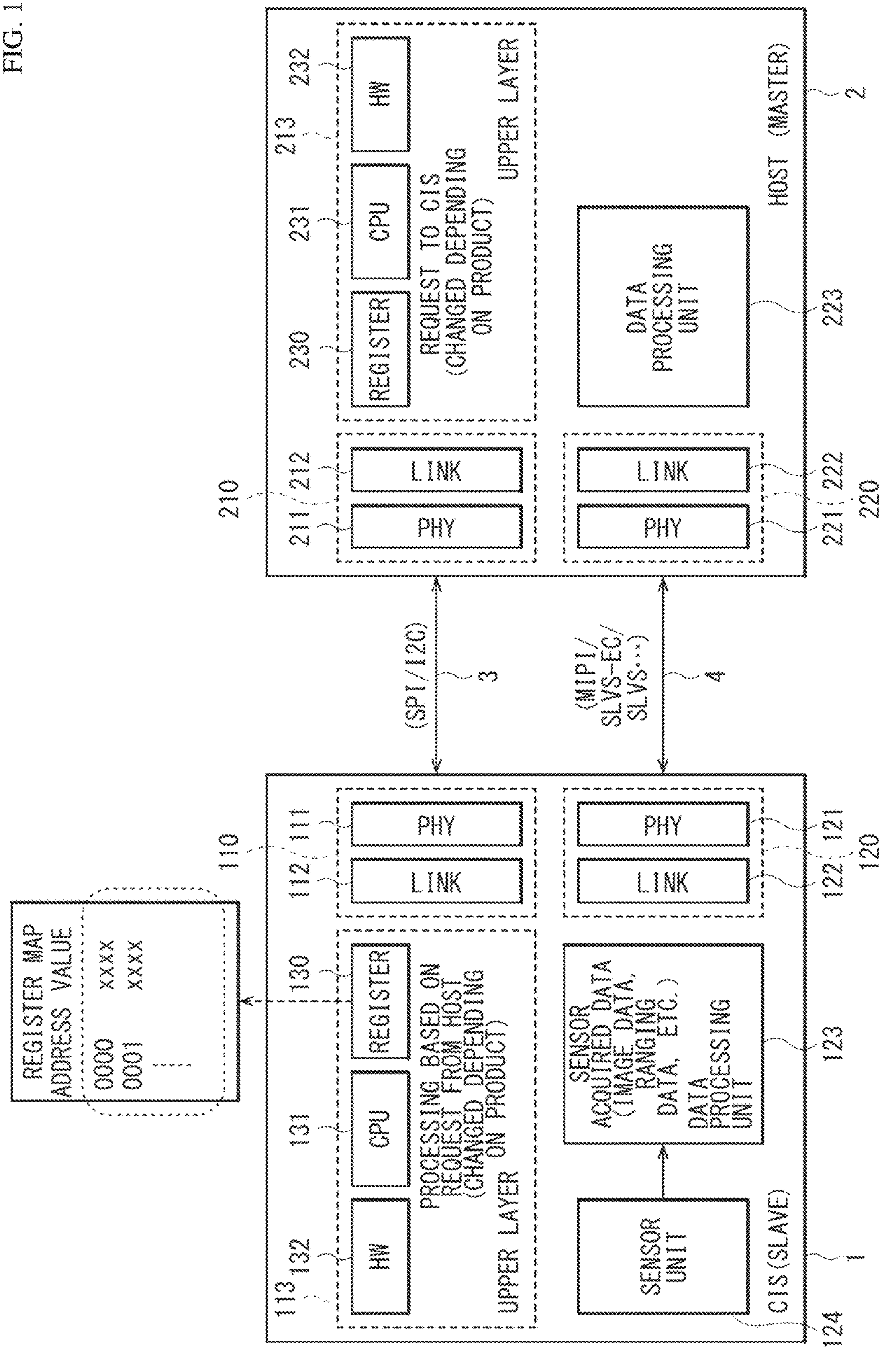
FIG. 1 is a block diagram schematically illustrating an overall configuration example of a data transmission system according to one embodiment of the present disclosure.

FIG. 1 schematically illustrates an overall configuration example of a data transmission system according to an embodiment of the present disclosure.

The data transmission system according to the embodiment relates to, for example, a technique that improves security of register communication between an image sensor (a CIS (CMOS (Complementary Metal-Oxide Semiconductor) Image Sensor) 1) and a host 2 inside a camera.

The data transmission system according to the embodiment includes the CIS 1 serving as a data processing device, the host 2, a transmission line 3, and a transmission line 4.

The CIS 1 includes a communication unit 110, an upper layer 113, a communication unit 120, a data processing unit 123, and a sensor unit 124.

The communication unit 110 includes a physical layer (PHY) 111 and a link layer (LINK) 112. The communication unit 120 includes a physical layer (PHY) 121 and a link layer (LINK) 122.

The upper layer 113 includes a register 130, a CPU (Central Processing Unit) 131, and hardware (HW) 132. Note that the upper layer 113 may also have a configuration from which the CPU 131 is omitted.

The host 2 includes a communication unit 210, an upper layer 213, a communication unit 220, and a data processing unit 223.

The communication unit 210 includes a physical layer (PHY) 211 and a link layer (LINK) 212. The communication unit 220 includes a physical layer (PHY) 221 and a link layer (LINK) 222.

The upper layer 213 includes a register 230, a CPU 231, and hardware (HW) 232.

In general, the CIS 1 has a communication IF (a register IF) that performs communication between the CIS 1 as a slave and the host 2 as a master, and a high-speed IF (a data output IF) that outputs a large amount of data such as image data acquired by the sensor unit 124.

The communication unit 110 of the CIS 1 and the communication unit 110 of the host 2 each configure a communication IF (a register IF) configured to perform mutual communication (register communication) between the respective registers 130 and 230 via the transmission line 3. The register IF may be equipped with multiple kinds of IFs with different protocols and configured to switch between the multiple kinds of IFs. For example, the register IF may be equipped with and configured to switch between two kinds of IFs of a SPI (Serial Peripheral Interface) and an I2C (Inter Integrated Circuit).

The communication unit 120 of the CIS 1 configures a high-speed IF (a data output IF) that outputs a large amount of data such as the image data acquired by the sensor unit 124 to the communication unit 220 of the host 2 via the transmission line 4. Examples of the high-speed IF include a MIPI (Mobile Industry Processor Interface), a SLVS-EC (Scalable Low Voltage Signaling with Embedded Clock), and a SLVS (Scalable Low Voltage Signaling).

The register 130 of the CIS 1 stores setting information transmitted from the host 2 via the register IF. Processing operation of each unit inside the CIS 1 is determined depending on what kind of value is set as the setting information in the register 130. Examples of the setting information include, exposure time, Gain, resolution (pixel addition or thinning number), a frame rate, a ROI (Region of Interest), and other information such as an operation mode. In addition, the register 130 of the CIS 1 stores information regarding various states, environment information, etc. in the CIS 1. The information regarding the various states, the environment information, etc. stored in the register 130 are readable by the host 2 via the register IF. Examples of the information regarding the various states, the environment information, etc. include temperature information inside the CIS 1, metadata when image information from the sensor unit 124 is processed by the data processing unit 123, and error or warning detection information.

In the host 2, the upper layer 213 determines what kind of behavior the CIS 1 is to exhibit, and transmits a value that determines the behavior of the CIS 1 as the setting information via the register IF. The host 2 changes the value of the setting information, in accordance with the information regarding the various states, the environment information, etc. read from the register 130 of the CIS 1. Because what kind of behavior the CIS 1 is to exhibit differs depending on a use case, SW (software) of the CPU 231 of the host 2 often has a relatively easily rewritable configuration. In a case where the upper layer 213 includes a FPGA (Field Programmable Gate Array), the CPU 231 and the hardware 232 both have a variable configuration.

Determining standards or the like of the physical layers 111 and 211 and the link layers 112 and 212 configuring the register IFs as a rule allows for communication between the CIS 1 and the host 2 regardless of a product. Portions specialized for the product may be, for example, determined by only the upper layers 113 and 213 depending on specifications (definition of addresses and values) or the like of the registers 130 and 230. For example, in the register IFs, a rule is determined for how to perform transmission of the setting information, as specifications of the physical layers 111 and 211 and the link layers 112 and 212. Thus, by only defining, for example, the addresses of the registers 130 and 230 and operation to be performed in a case where a value is set in the register 130, it is possible for the upper layers 113 and 213 to exchange control information and other information between the CIS 1 and the host 2 via the register IFs.

(General Safety and Security Technique)

Figure 2:
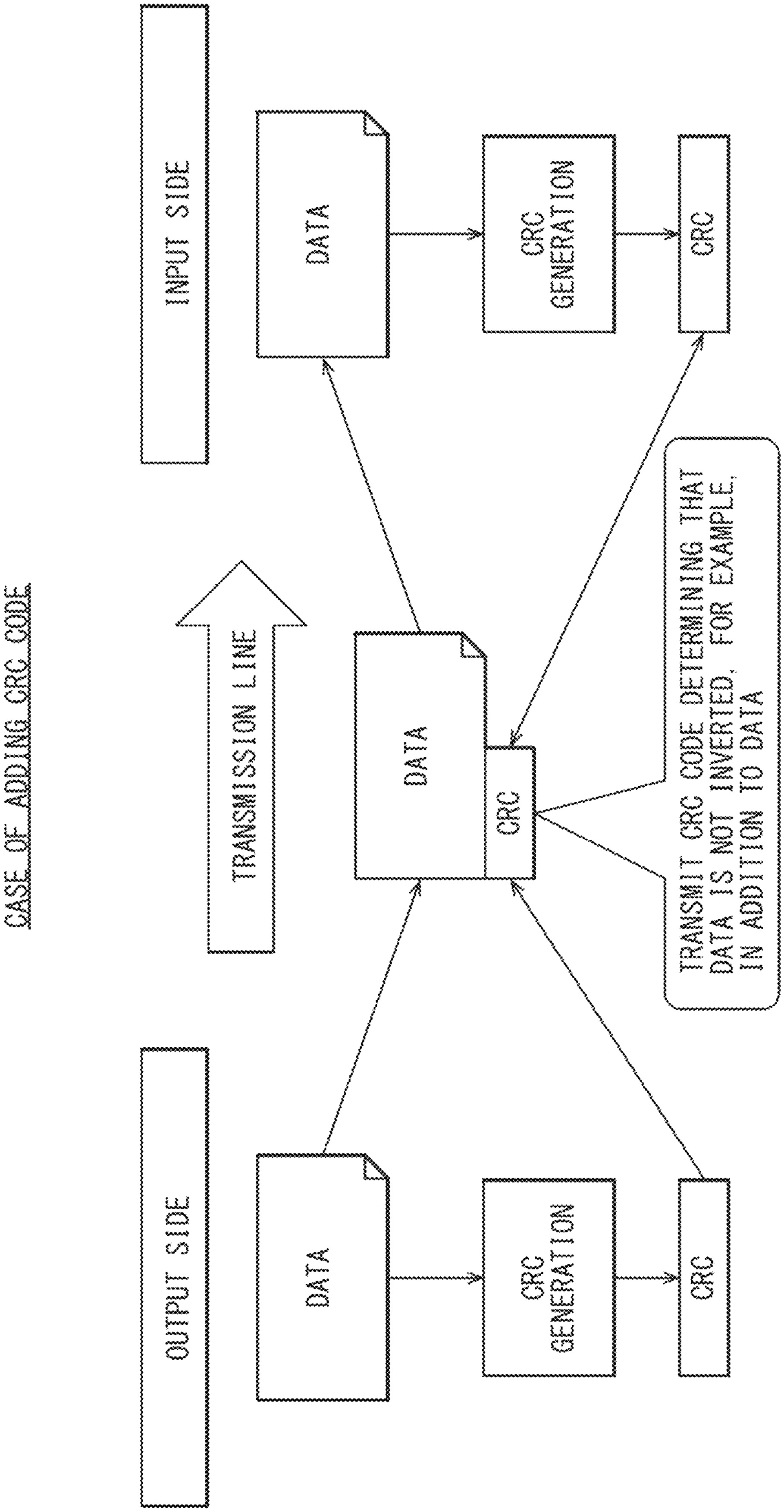
FIG. 2 is an explanatory diagram schematically illustrating, as a general safety and security technique, an example of communication by addition of a CRC code.

FIG. 2 schematically illustrates, as a general safety and security technique, an example of communication by addition of a CRC code (an error detection code).

Functions that detect inversion of data due to electromagnetic noise or the like include CRC (error determination) and ECC (error correction). For example, in the CRC, a CRC code to be used to determine that data is not inverted, for example, is added in addition to communication target data. A data output side generates a CRC code on the basis of data, adds the generated CRC code to the data, and outputs the data. A data input side generates a CRC code on the basis of inputted data, and compares the CRC code with a CRC code added to the data to thereby perform error determination of the data.

Figure 3:
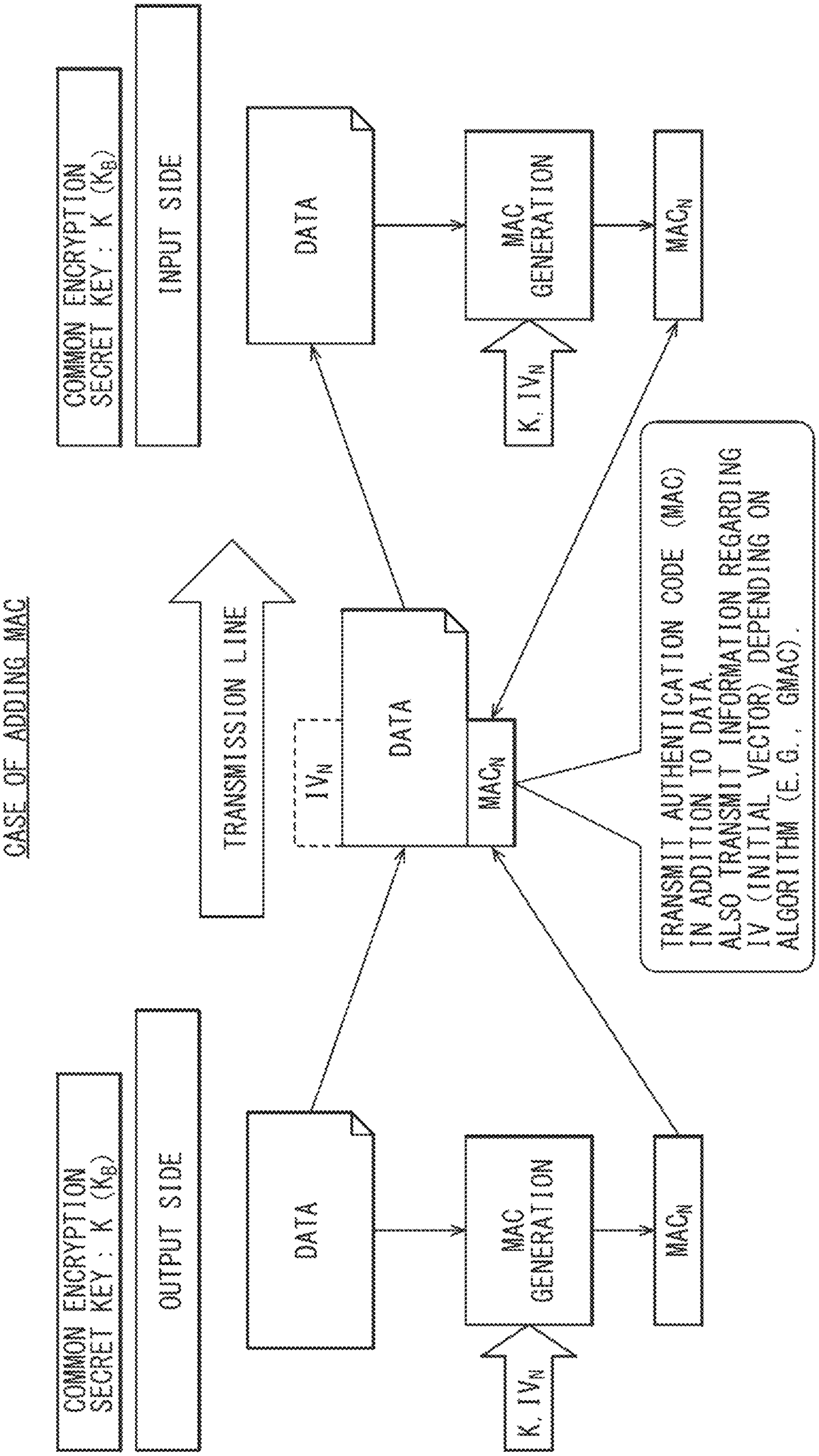
FIG. 3 is an explanatory diagram schematically illustrating, as a general safety and security technique, an example of communication by addition of a message authentication code.

FIG. 3 schematically illustrates, as a general safety and security technique, an example of communication by addition of a message authentication code (MAC).

Functions that detect tampering with data or data transmission by spoofing include a technique of adding a MAC or a signature. For communication demanded of a real-time property, such as communication by the communication IF, a MAC is generally used often (a signature may be used). In a technique of adding a MAC, the data output side and the data input side have a common encryption secret key K ($K_B$). The data output side generates a MAC by using the common encryption secret key K ($K_B$), adds the generated MAC to communication target data, and outputs the data. Information regarding an IV (initial vector) is also added for output, depending on an algorithm of the MAC. For example, in a case of a CMAC (Cipher-based Message Authentication Code), IV information is unnecessary because calculation is performed with IV=0, but in a case of using a GMAC (Galois Message Authentication Code), information regarding the IV is also added for output. The data input side generates a MAC by using the common encryption secret key K ($K_B$), and compares the MAC with a MAC added to data to thereby perform authentication of the data.

Figure 4:
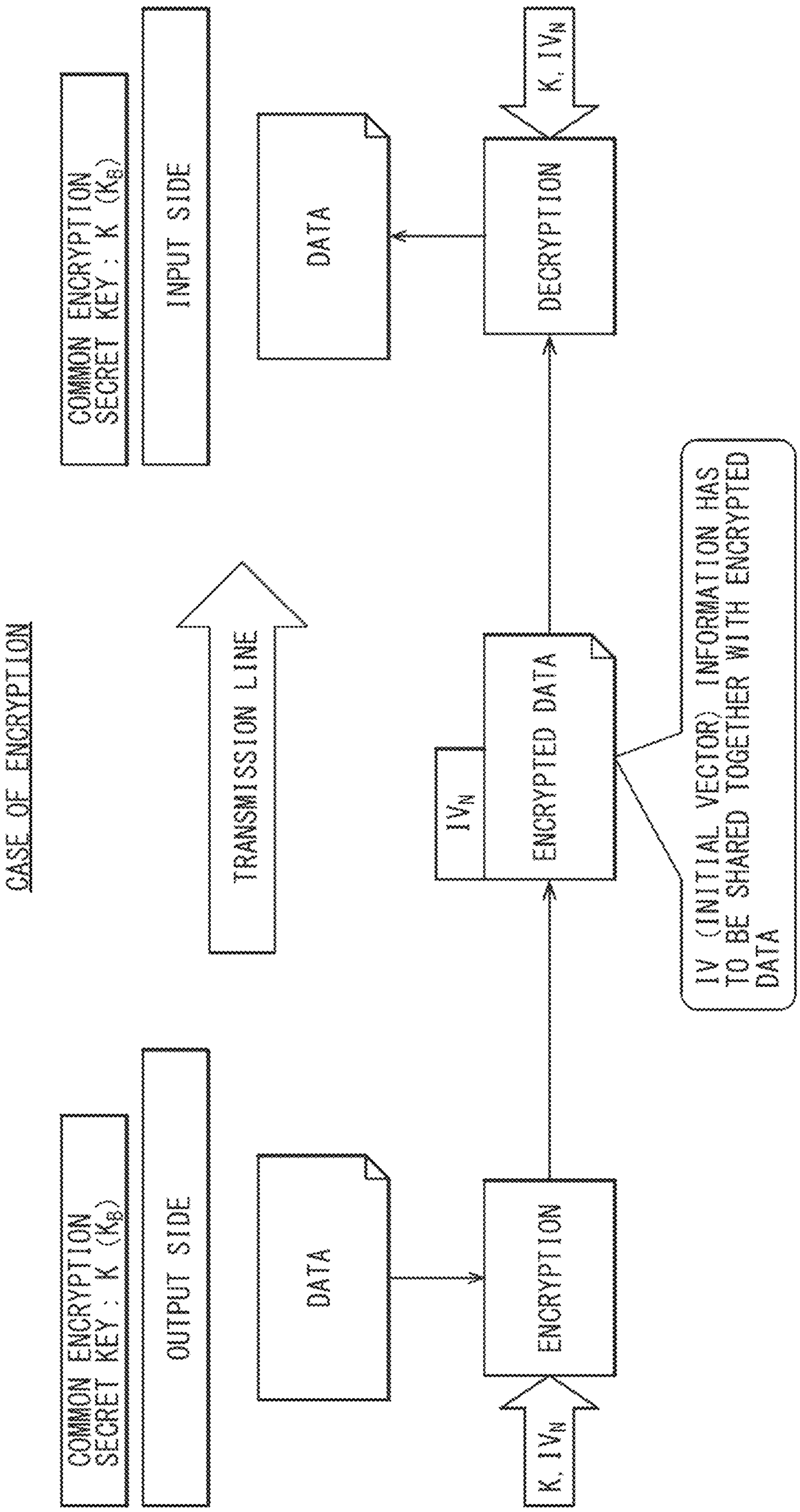
FIG. 4 is an explanatory diagram schematically illustrating, as a general safety and security technique, an example of communication by encryption.

FIG. 4 schematically illustrates, as a general safety and security technique, an example of communication by encryption.

To prevent data itself from being snooped into, an encryption technique is used in some cases. In a case of using the encryption technique, for example, the data output side and the data input side have the common encryption secret key K ($K_B$). The data output side encrypts communication target data by using the common encryption secret key K ($K_B$) and the IV (initial vector) to generate and output encrypted data. The data input side decrypts the encrypted data by using the common encryption secret key K ($K_B$) and the IV.

(Issue)

For example, regarding the configuration of the data transmission system illustrated in FIG. 1, security requests for the CIS 1 are arising, but not all clients for the CIS 1 make the same security request. In addition, in a case of products with long product lifetime such as industrial equipment, it is difficult to change the host 2 (a FPGA or an ASIC (Application Specific Integrated Circuit)) for all the products to that supporting a security protocol of the CIS 1 at the same time. Some register IFs are equipped with multiple kinds of IFs with different protocols and configured to switch between the multiple kinds of IFs, in this case, specifications that make it possible to maintain security of the register IF are necessary without changing the protocol of each IF. What kind of function is necessary changes depending on an application in which the CIS 1 is incorporated. As described above, examples of security techniques include CRC, MAC, and encryption, and the techniques provide different functions. Defining the protocol of the register IF differently for each necessary function makes it difficult to expand the technique. It is necessary to keep updating protocols of the physical layers 111 and 211 and the link layers 112 and 212 of the register IFs depending on contents, which uses cost.

Hence, it is desired to implement a safety and security function that is implementable within a range of a standard and specifications of an existing register IF. It is desired to implement the safety and security function of the register IF by a highly flexible change of specifications of the upper layers 113 and 213 implementable by a change of software, addition of the hardware 132 and 232, or the like, instead of changing the register IF portion. This makes it possible to improve security while using the existing register IF.

[1.2 Safety and Security Technique Based on Technology According to Embodiment]

Next, the safety and security technique based on the data transmission system according to the embodiment is described in detail.

(1.2.1 Overview of Safety and Security Technique)

FIG. 5 illustrates an example of a configuration (a register map) of the register 130 based on the technology according to the embodiment. Note that addresses in the register map illustrated in FIG. 5 are examples, and may be changed on an as-needed basis.

The register 130 in the CIS 1 includes, as an address region, a setting region (a sensor register 311) that stores the setting information transmitted from the host 2. In the technology according to the embodiment, in addition to the sensor register 311, the register 130 further includes, as address regions for safety and security, a security data region (a functional safety and security data region 313) that stores security data for the setting information, and a communication information region (a communication information register 312) that stores communication information with the host 2.

In the technology according to the embodiment, the upper layers 113 and 213 exchange safety and security information between the CIS 1 and the host 2, by using the address regions for safety and security in the register 130. A configuration in which a function supported by a target couplable by the existing register IF is selectable or changeable later makes it possible to check safety and security in the upper layers 113 and 213, instead of determining it on the basis of a rule on the protocol of the register IF. The technology according to the embodiment may have a function of determining whether or not it is the address region for safety and security, or a function configured to select whether or not to allow for access to the address region for safety and security.

The functional safety and security data region 313 stores, as an example of the security data, an error detection code (a CRC code) related to the setting information or a message authentication code (MAC) related to the setting information, as will be described later. In addition, the functional safety and security data region 313 stores, as an example of the security data, encrypted data including the setting information, as will be described later. The functional safety and security data region 313 is, for example, an address region of 256 bytes×n. The functional safety and security data region 313 may include a Write register for writing of the security data and a Read register for reading of the security data.

The communication information register 312 is a mode setting register for safety and security. The communication information register 312 stores, as an example of the communication information, communication mode information indicating a communication mode of the register communication, status information indicating a communication start of the register communication, and status information indicating a communication end of the register communication. The communication information is, for example, indicated by FS_S_STATE as will be described later. For example, FS_S_STATE=0 indicates the communication end, and FS_S_STATE≠0 indicates the communication start.

Note that, for example, whether or not to use the functional safety and security data region 313 and the communication information register 312 of the register 130 may be configured to be switchable by a CPU code or a Fuse in the CIS 1. In addition, which of multiple functions based on the safety and security technique is to be used may be configured to be switchable by the CPU code or the Fuse. Using the communication information register 312 and the functional safety and security data region 313 in common between the multiple functions makes it possible to reduce a size of a register region. It is possible to select which of the multiple functions is to be used later, by setting at the time of startup of the product, a change of the software portion, or switching using the Fuse.

As the address regions of the communication information register 312 and the functional safety and security data region 313, only regions necessary for the function of the supported operation mode, of the multiple functions of the safety and security technique, may be prepared. For example, if a large region is unnecessary as in a case where the CIS 1 supports only CRC, the address regions of the communication information register 312 and the functional safety and security data region 313 may have small sizes. If the CIS 1 supports CRC and MAC, only the region with the larger size of the address regions necessary for CRC and MAC may be prepared. It is unnecessary to prepare both the address region for CRC and the address region for MAC even in a configuration supporting both CRC and MAC.

Figure 10:
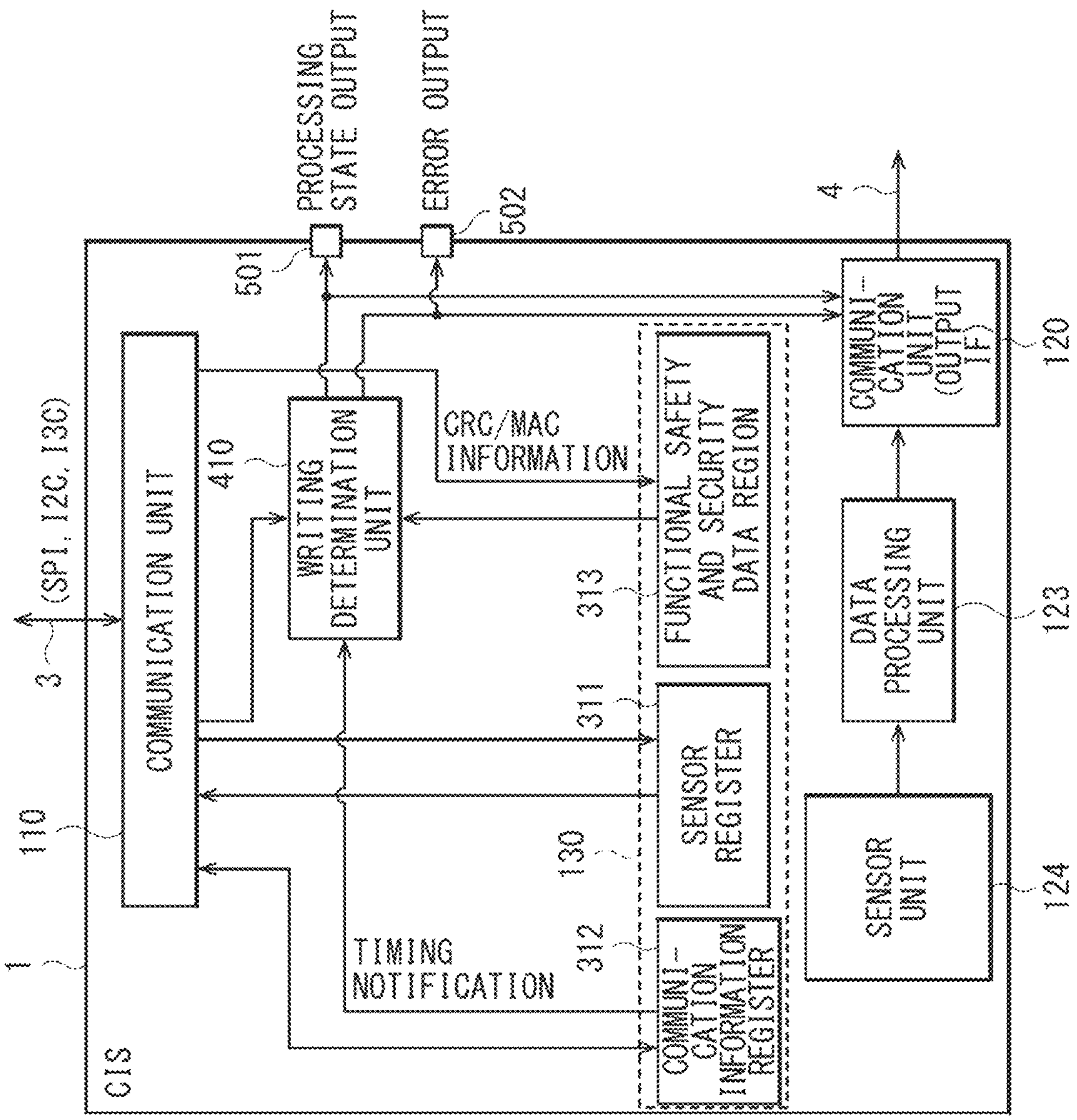
FIG. 10 is a block diagram schematically illustrating a first configuration example of a CIS serving as a data processing device according to one embodiment.
Figure 14:
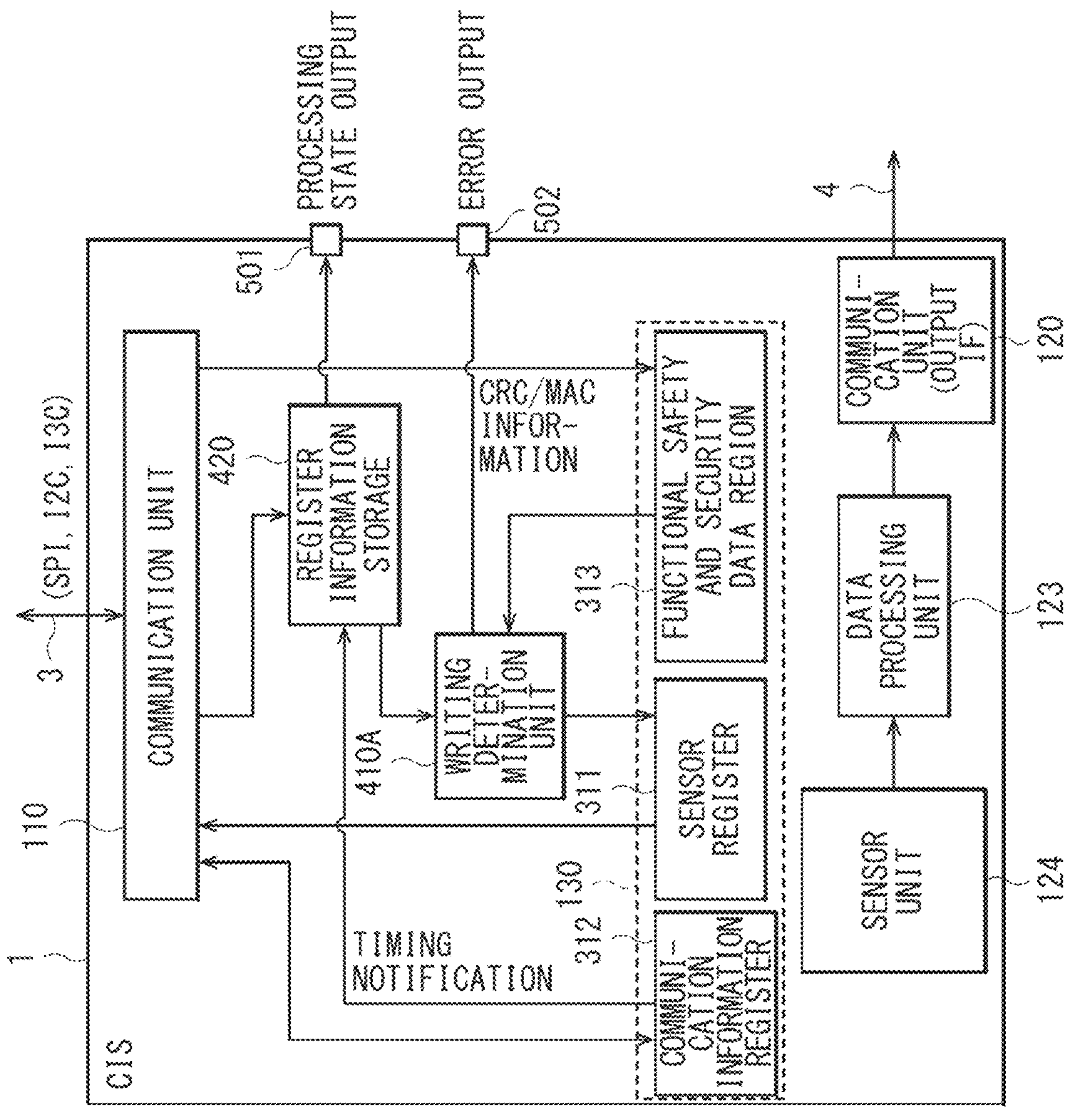
FIG. 14 is a block diagram schematically illustrating a second configuration example of the CIS serving as the data processing device according to one embodiment.

The technology according to the embodiment has a function of providing notification information related to safety and security from the CIS 1 side serving as the slave. The notification information may be, for example, a processing status indicating a processing state in the register 130, or error information caused in processing in the register 130, as will be described later. The processing status is, for example, indicated by a processing state FS_S_ACT as will be described later. The error information is, for example, indicated by an error state FS S ERR as will be described later. The CIS 1 includes a notification unit that outputs the notification information. The notification unit may be, for example, writing determination units 410 and 410A and a register information storage 420 (FIG. 10, FIG. 14, etc. described later), which will be described later. The notification information may be outputted to the host 2 by dedicated terminals (a processing state output terminal 501 and an error output terminal 502), as illustrated in FIG. 10, FIG. 14, etc. described later. As the register IF or another IF, such an IF that the slave side has an interruption function such as an I3C (Improved Inter Integrated Circuits) may be included, and the IF having the interruption function may be used to output the notification information to the host 2. In addition, the communication unit 120 serving as a data output unit may add the notification information from the notification unit to sensor data outputted from the sensor unit 124, and output the notification information together with the sensor data to the host 2. A notification method for the notification information may be a combination of the multiple methods described above.

(1.2.2 Specific Examples of Safety and Security Technique)

In the following, a communication mode using MAC is referred to as a MAC mode, a communication mode using CRC is referred to as a CRC mode, and a communication mode using encryption is referred to as an encryption mode.

(Example of Writing of Setting Information in MAC Mode)

Figure 6:
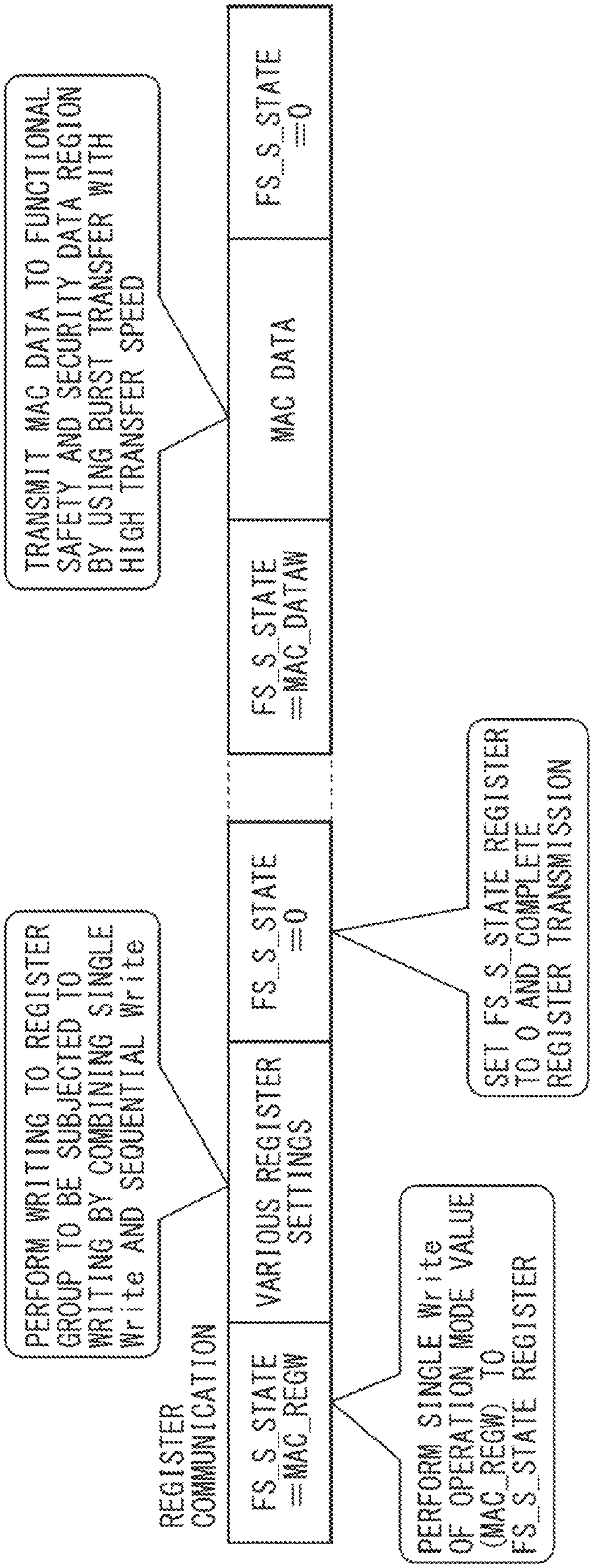
FIG. 6 is a sequence diagram illustrating an example of register communication based on the technology according to one embodiment.

FIG. 6 is a sequence diagram illustrating an example of the register communication based on the technology according to the embodiment. FIG. 6 illustrates an example of the register communication in a case of writing the setting information to the sensor register 311 in the MAC mode.

First, as the communication information, the status FS_S_STATE=MAC_REGW indicating a start request for writing of the setting information to the sensor register 311 in the MAC mode is transmitted from the host 2 via the register IF. The CIS 1 performs single Write (writing) of the operation mode value (MAC_REGW) to a FS_S_STETE register of the communication information register 312. Next, the setting information to the sensor register 311 is transmitted from the host 2 via the register IF. As the setting information, for example, the address where the setting value is to be changed in the sensor register 311 and a setting value group (multiple values may be combined) are transmitted. The CIS 1 writes the setting information to the sensor register 311. Thus, various register settings are made in the sensor register 311. In the sensor register 311, writing to a register group to be subjected to writing may be performed by combining single Write (writing) and sequential Write (writing).

Next, as the communication information, the status FS_S_STATE=0 indicating an end request for writing of the setting information to the sensor register 311 in the MAC mode is transmitted from the host 2 via the register IF. The CIS 1 sets the operation mode value of the FS_S_STETE register of the communication information register 312 to 0.

Next, as the communication information, the status FS_S_STATE=MAC_DATAW indicating a start request for writing of the security data in the MAC mode is transmitted from the host 2 via the register IF. The CIS 1 performs single Write (writing) of the operation mode value (MAC_DATAW) to the FS_S_STETE register of the communication information register 312. Next, the security data (MAC data) in the MAC mode is transmitted from the host 2 via the register IF. The CIS 1 writes the MAC data to the functional safety and security data region 313. The MAC data may be transmitted by burst transfer with a high transfer speed. As the security data, information necessary for processing other than MAC may also be transmitted. For example, information such as mode information of MAC in a case with multiple algorithms or the IV in a case of using GMAC may also be transmitted. In a case where multiple algorithms are supported, the operation mode may be fixed in advance at the time of startup of the product or by, for example, the Fuse.

Next, as the communication information, the status FS_S_STATE=0 indicating an end request for writing of the security data in the MAC mode is transmitted from the host 2 via the register IF. The CIS 1 sets the operation mode value of the FS_S_STETE register of the communication information register 312 to 0.

As described above, in the technology according to the embodiment, notification of the communication mode is provided as the communication information from the host 2, which makes it possible for the CIS 1 to support multiple transfer modes. As described above, in the technology according to the embodiment, by storing, as the communication information, the status information indicating the communication start and the status information indicating the communication end in the communication information register 312, it is possible to transmit a chunk of data from the host 2 regardless of the address region of the register 130 to be set. It is thus possible to perform communication uninfluenced by transfer units, such as the burst transfer. In addition, it is possible to clarify a transmission start of data between the host 2 and the CIS 1. The technology according to the embodiment makes it possible to collectively set multiple addresses and data as a target of CRC, MAC, or encryption. The technology according to the embodiment makes it possible to efficiently transmit data, as compared with transmitting CRC data or MAC data for, for example, each transfer unit.

(Example of Writing of Setting Information in CRC Mode)

Figure 7:
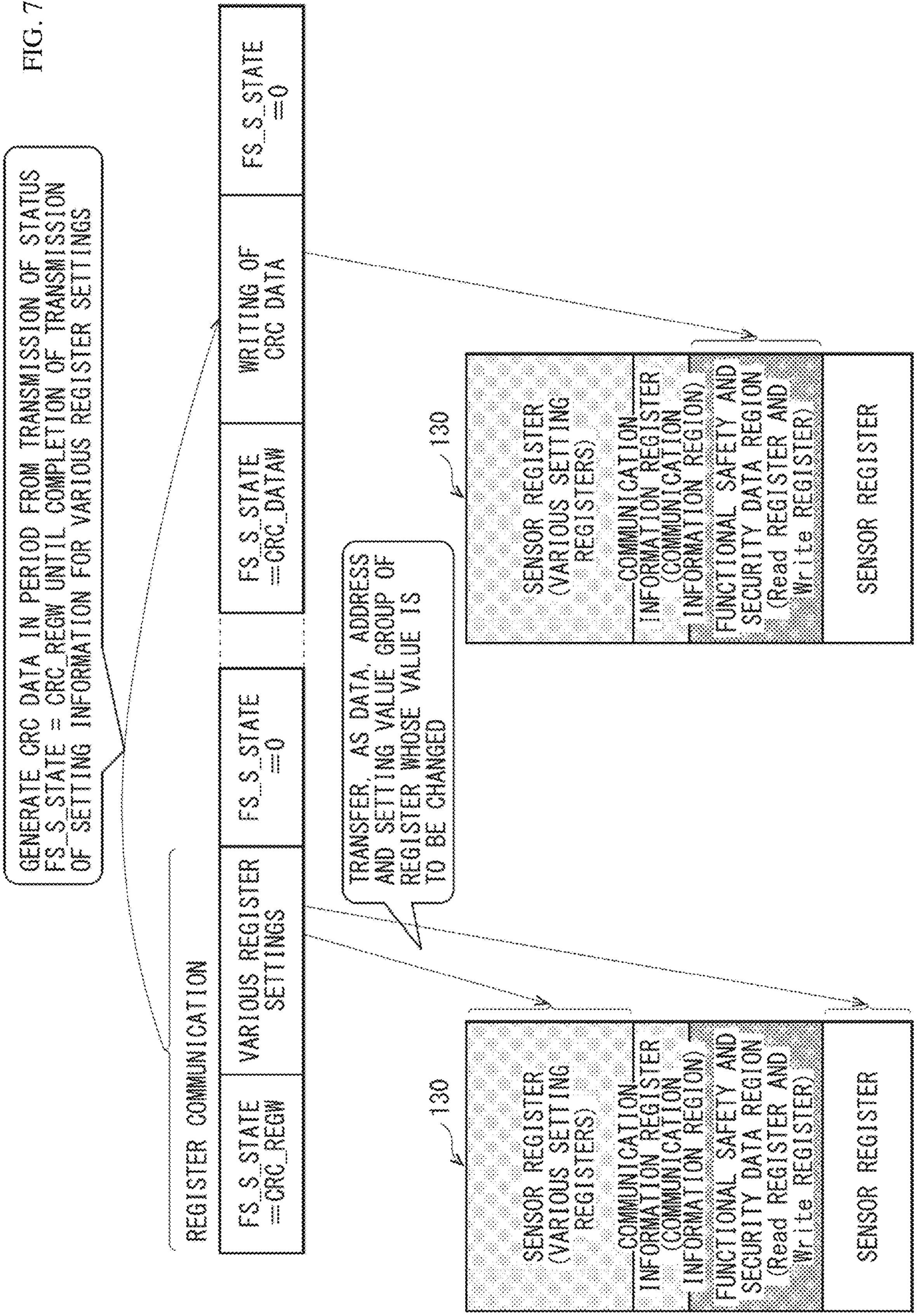
FIG. 7 is a sequence diagram illustrating an example of register communication based on the technology according to one embodiment.

FIG. 7 is a sequence diagram illustrating an example of the register communication based on the technology according to the embodiment. FIG. 7 illustrates an example of the register communication in a case of writing the setting information to the sensor register 311 in the CRC mode. FIG. 7 illustrates an example in a case where it relatively takes time from transmission of the setting information to transmission of CRC data.

Note that the CRC mode and the MAC mode have basically similar operation images except for a difference in arithmetic processing performed on data to be protected.

First, as the communication information, the status FS_S_STATE=CRC_REGW indicating a start request for writing of the setting information to the sensor register 311 in the CRC mode is transmitted from the host 2 via the register IF. As the setting information, for example, the address where the setting value is to be changed in the sensor register 311 and a setting value group (multiple values may be combined) are transmitted. The CIS 1 performs single Write (writing) of the operation mode value (CRC_REGW) to a FS_S_STETE register of the communication information register 312. Next, the setting information to the sensor register 311 is transmitted from the host 2 via the register IF. The CIS 1 writes the setting information to the sensor register 311. Thus, various register settings are made in the sensor register 311. In the sensor register 311, writing to a register group to be subjected to writing may be performed by combining single Write (writing) and sequential Write (writing).

Next, as the communication information, the status FS_S_STATE=0 indicating an end request for writing of the setting information to the sensor register 311 in the CRC mode is transmitted from the host 2 via the register IF. The CIS 1 sets the operation mode value of the FS_S_STETE register of the communication information register 312 to 0.

Next, as the communication information, the status FS_S_STATE=CRC_DATAW indicating a start request for writing of the security data in the CRC mode is transmitted from the host 2 via the register IF. The CIS 1 performs single Write (writing) of the operation mode value (CRC_DATAW) to the FS_S_STETE register of the communication information register 312. Next, the security data (CRC data) in the CRC mode is transmitted from the host 2 via the register IF. The CIS 1 writes the CRC data to the functional safety and security data region 313. The CRC data may be transmitted by burst transfer with a high transfer speed. As the security data, information necessary for processing other than CRC may also be transmitted. For example, mode information of CRC in a case with multiple algorithms may also be transmitted. In a case where multiple algorithms are supported, the operation mode may be fixed in advance at the time of startup of the product or by, for example, the Fuse. The CIS 1 generates the CRC data in a period from transmission of the status FS_S_STATE=CRC_REGW until completion of transmission of the setting information for various register settings.

Next, as the communication information, the status FS_S_STATE=0 indicating an end request for writing of the security data in the CRC mode is transmitted from the host 2 via the register IF. The CIS 1 sets the operation mode value of the FS_S_STETE register of the communication information register 312 to 0.

(Example of Partly Omitting Transmission of Communication Information)

In a case of performing the register communication in a second communication mode after performing the register communication in a first communication mode, the status information indicating the communication end of the register communication in the first communication mode may be configured to be omittable. For example, in the examples of the register communication illustrated in FIG. 6 and FIG. 7, the status FS_S_STATE=0 indicating the communication end may be partly omitted.

Figure 8:
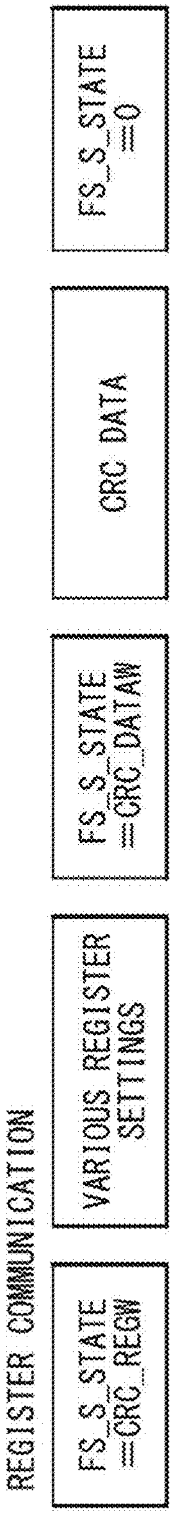
FIG. 8 is a sequence diagram illustrating an example of register communication in a case of partly omitting transmission of communication information.
Figure 9:
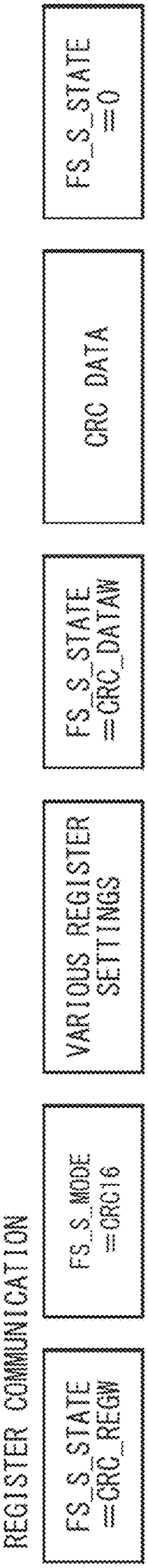
FIG. 9 is a sequence diagram illustrating an example of register communication in a case of partly omitting transmission of communication information.

FIG. 8 and FIG. 9 are each a sequence diagram illustrating an example of the register communication in a case of partly omitting transmission of the communication information. FIG. 8 and FIG. 9 each illustrate an example in a case where it relatively does not take time from transmission of the setting information to transmission of the CRC data.

FIG. 8 illustrates an example of the register communication in a case of writing the setting information to the sensor register 311 in the CRC mode. For example, as in the example illustrated in FIG. 8, in a case where it is possible to transition immediately from a communication mode (a CRC_REG mode), as the first communication mode, of performing writing of the setting information to the sensor register 311 in the CRC mode to a communication mode (a CRC_DATA mode), as the second communication mode, of performing writing of the security data in the CRC mode, the status (FS_S_STATE=0) indicating the communication end of the CRC REG mode may be omitted.

FIG. 9 illustrates an example of the register communication in a case where, in writing the setting information to the sensor register 311 in the CRC mode, information designating the algorithm of CRC is further transmitted as the communication information from the host 2. In the example of FIG. 9, the status FS_S_MODE=CRC_REG indicating a start request for the CRC_REG mode is transmitted from the host 2, and thereafter, the status FS_S_MODE=CRC16 indicating that the operation mode of CRC is CRC16 is transmitted from the host 2. Thereafter, data regarding various register settings is transmitted, the status (FS_S_STATE=0) indicating the communication end of the CRC REG mode is omitted, and immediately thereafter, a transition is made to the CRC DATA mode.

(Circuit Configuration Example 1)

FIG. 10 schematically illustrates a first configuration example of the CIS 1 serving as the data processing device according to the embodiment.

In the first configuration example illustrated in FIG. 10, the CIS 1 includes the communication unit 110, the communication unit 120, the data processing unit 123, the sensor unit 124, the register 130, the writing determination unit 410, the processing state output terminal 501, and the output terminal 502.

The processing state output terminal 501 outputs, as the notification information, the processing status (the processing state FS_S_ACT) indicating the processing state in the register 130 to the host 2. The error output terminal 502 outputs, as the notification information, the error information (the error state FS_S_ERR) caused in the processing in the register 130 to the host 2.

The data processing unit 123 performs various kinds of data processing on the sensor data outputted from the sensor unit 124. The communication unit 120 adds the notification information such as the error information to the sensor data subjected to the various kinds of data processing in the data processing unit 123, and outputs the sensor data to the host 2.

FIG. 10 illustrates a configuration example in a case of, after writing the setting value to the sensor register 311, determining whether or not the written value is a correct value by, for example, CRC. In the sensor register 311, the setting value from the host 2 is sequentially reflected via the communication unit 100. Note that reflection of the setting value in each unit of the CIS 1 may be, for example, performed after the setting value is latched at a timing of a frame synchronization signal (Frame Sync) of the sensor data. In the configuration example, a storage memory (the register information storage 420) or the like that temporarily stores the setting value to the sensor register 311, as in a configuration example illustrated in FIG. 14 described later, is unnecessary; therefore, no upper limit has to be provided for the communication. In the configuration example, a value other than a desired value can be written to the register 130, but in that case, outputting the error information to the sensor data or the error output terminal 502 makes it possible to notify the host 2 of an error in the setting value. Note that the error information and the processing status may be configured to be readable from the register 130 (the register communication may be utilized), instead of being outputted to the host 2 via the error output terminal 502 and the processing state output terminal 501.

FIG. 11 illustrates a specific example of the writing determination unit 410 in the CIS 1 illustrated in FIG. 10.

The writing determination unit 410 includes a register communication detection unit 411, a data calculation unit 412, an error detection unit 413, and a Write counter 414.

The register communication detection unit 411 detects that the register communication has been performed. The data calculation unit 412 performs calculation related to CRC, MAC, encryption, and the like. The error detection unit 413 performs error detection based on a calculation result of the data calculation unit 412. The Write counter 414 counts that a writing request to the register 130 has been made, on the basis of a detection result of the register communication detection unit 411.

After writing of the setting information is reflected in the sensor register 311, the writing determination unit 410 performs correctness determination of the setting information reflected in the sensor register 311, on the basis of the security data. From the communication information register 312 to the writing determination unit 410, notification of a calculation start timing and a calculation end timing in the data calculation unit 412 is provided. In addition, from the communication information register 312, notification is provided of, for example, completion of writing (a determination timing) of the security data such as the CRC data or the MAC data to the functional safety and security data region 313.

Figure 12:
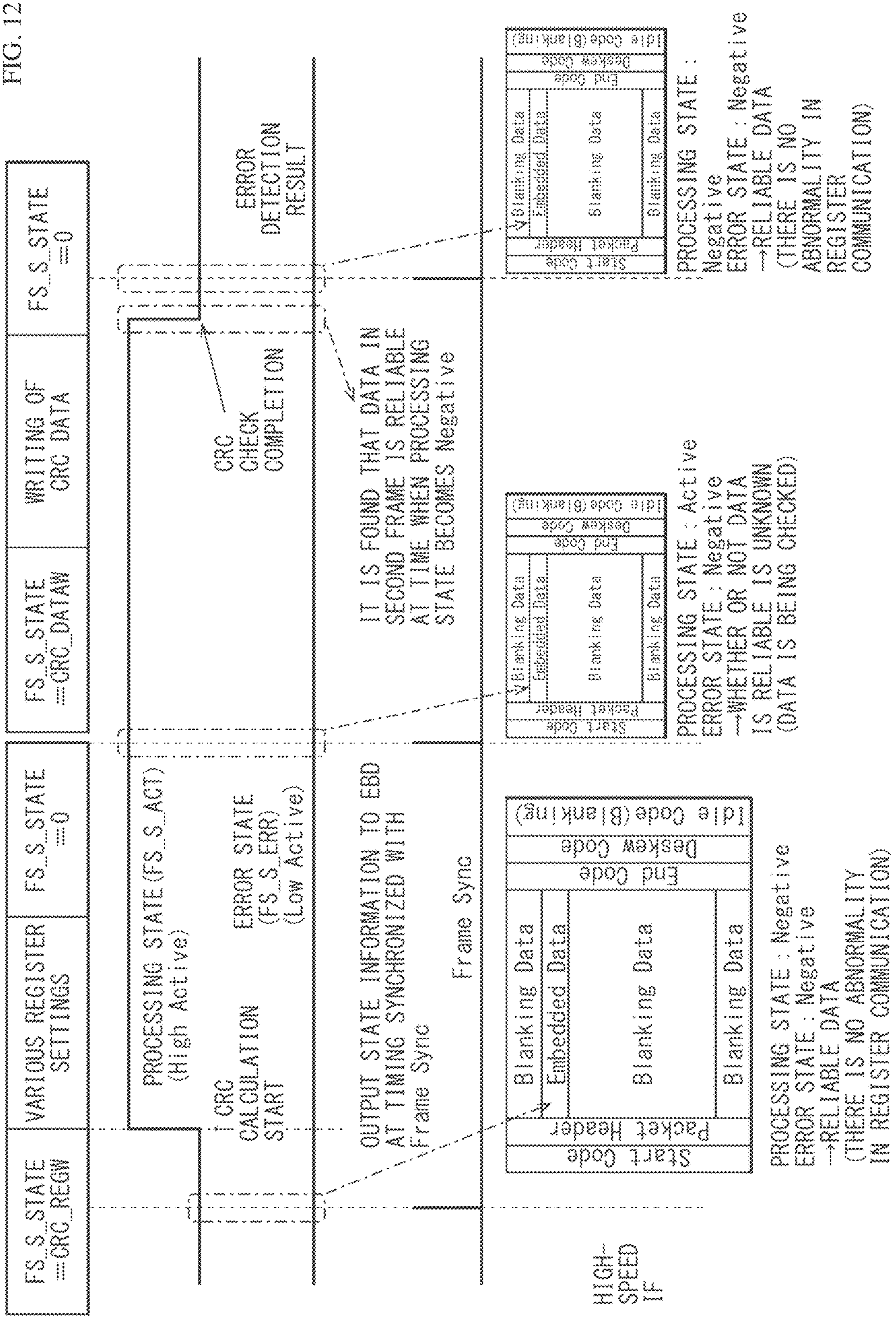
FIG. 12 is a sequence diagram illustrating an example of register communication implemented by the configuration example illustrated in FIG. 10.

FIG. 12 is a sequence diagram illustrating an example of the register communication implemented by the configuration example illustrated in FIG. 10. FIG. 12 illustrates an example of the register communication in a case of writing the setting information to the sensor register 311 in the CRC mode.

FIG. 12 illustrates an example of the register communication in a case of, after writing the setting value to the sensor register 311, determining whether or not the written value is a correct value by CRC. FIG. 12 illustrates an example of adding the notification information such as the error information of the setting value to the sensor data outputted from the sensor unit 124 and outputting the sensor data, in synchronization with the frame synchronization signal of the sensor data. Even if the setting value is not reflected in the register 130 after it is determined whether or not the setting value is correct, adding the error information or the like to the sensor data and outputting the sensor data makes it possible to perform processing in a subsequent stage if it is found whether or not the setting value is reliable. There is also an advantage that it is possible to perform reflection in the register 130 as quickly as possible before performing register Write determination.

As for the processing state FS_S_ACT, for example, High indicates Active. As for the error state FS_S_ERR, for example, Low indicates Active. FIG. 12 illustrates, in the bottom stage, an example of a frame format of the sensor data. In a MIPI or a SLVS-EC, Embedded Data (EBD) usable as a data region other than an image is defined as the frame format of the image data. The communication unit 120 serving as the data output unit outputs state information (the notification information) from the writing determination unit 410 serving as the notification unit to Embedded Data in the sensor data, for example, at a timing synchronized with the frame synchronization signal (Frame Sync).

In the example of FIG. 12, it is found whether or not the sensor data in a second frame is reliable at a time when the processing state FS_S_ACT becomes Negative. The host 2 finds whether or not the setting information has been transmitted successfully by checking the error state FS_S_ERR at a time when the processing state FS S ACT becomes Low.

In the example of FIG. 12, in a first frame, the processing state FS S ACT is Negative, the error state FS_S_ERR is Negative, and it is possible to determine that the data is reliable data (there is no abnormality in the register communication).

In the second frame, the processing state FS_S_ACT is Active, the error state FS_S_ERR is Negative, and it is possible to determine that whether or not the data is reliable is unknown (the data is being checked).

In a third frame, the processing state FS_S_ACT is Negative, the error state FS_S_ERR is Negative, and it is possible to determine that the data is reliable data (there is no abnormality in the register communication).

Figure 13:
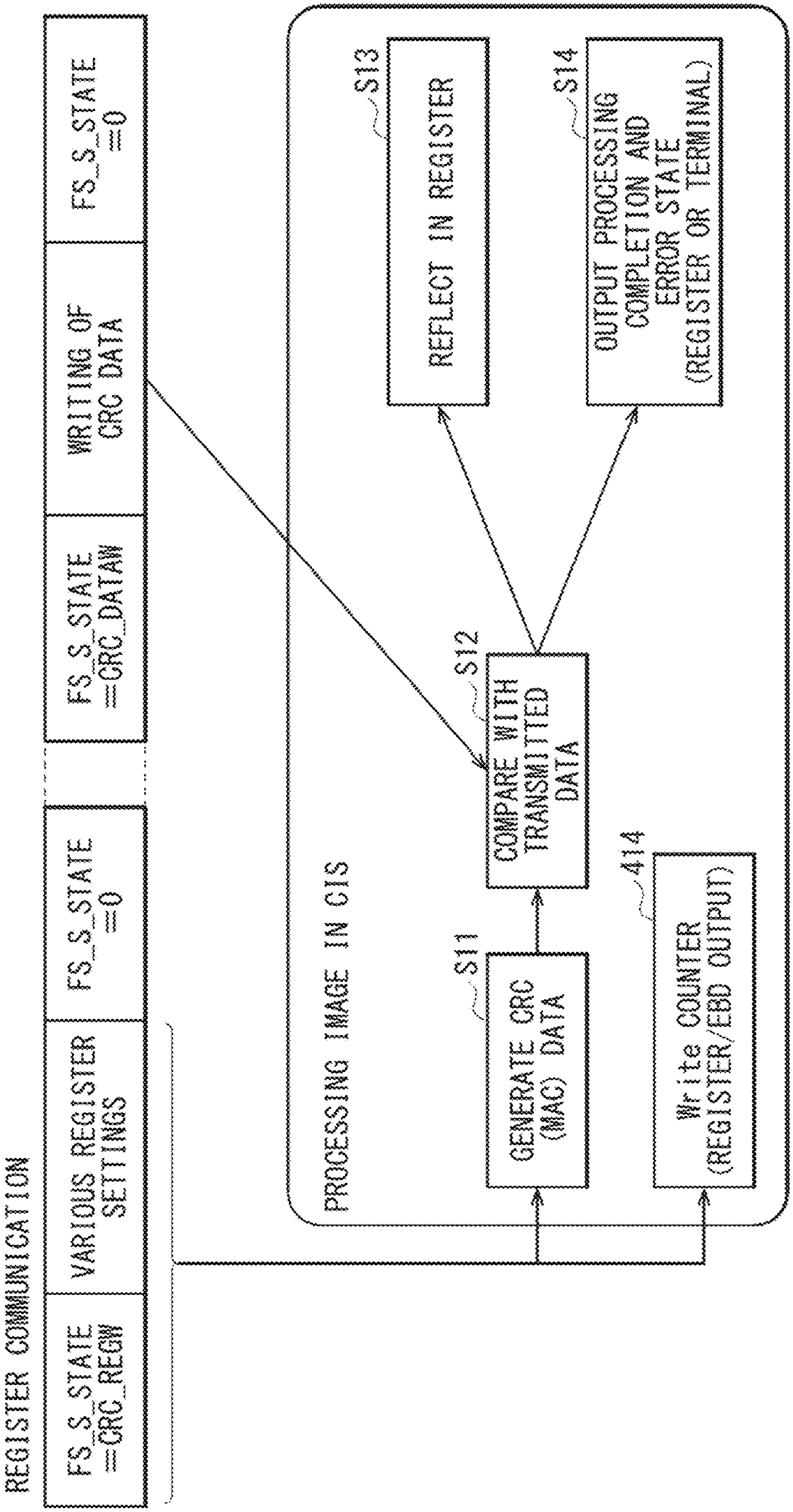
FIG. 13 is a sequence diagram illustrating an example of register communication based on the technology according to one embodiment.

FIG. 13 is a sequence diagram illustrating an example of the register communication based on the technology according to the embodiment. FIG. 13 illustrates an example of the register communication in a case of writing the setting information to the sensor register 311 in the CRC mode.

FIG. 13 illustrates an example of the register communication in a case of determining whether or not the setting value is a correct value by CRC before writing the setting value to the sensor register 311, and thereafter writing the setting value to the sensor register 311. Note that, also in a case of the MAC mode, it may be determined whether or not the setting value is a correct value by MAC before writing the setting value to the sensor register 311, and thereafter the setting value may be written to the sensor register 311.

FIG. 13 illustrates, in the lower stage, a processing image in the CIS 1, The CIS 1 generates the CRC data (the MAC data in a case of the MAC mode) on the basis of data of the setting information transmitted from the host 2 (step S11). In addition, the Write counter 414 counts that a writing request to the sensor register 311 has been made. Next, the CIS 1 compares the CRC data transmitted as the security data from the host 2 and the CRC data generated inside the CIS 1 (step S12). Thereafter, the CIS 1 reflects the setting value in the sensor register 311 (step S13). In addition, the CIS 1 provides processing completion notification using the processing state FS_S_ACT (step S14). In a case where there is an error, the CIS 1 provides notification of the error information using the error state FS_S_ERR (step S14).

(Circuit Configuration Example 2)

FIG. 14 schematically illustrates a second configuration example of the CIS 1 serving as the data processing device according to the embodiment.

In the second configuration example illustrated in FIG. 14, the CIS 1 includes the communication unit 110, the communication unit 120, the data processing unit 123, the sensor unit 124, the register 130, the writing determination unit 410A, the register information storage 420, the processing state output terminal 501, and the output terminal 502.

The register information storage 420 is a temporary storage unit that temporarily stores the setting information transmitted from the host 2. The writing determination unit 410A performs correctness determination of the setting information stored in the register information storage 420, on the basis of the security data of CRC, MAC, or the like, and reflects writing of the setting information in the sensor register 311 in a case where it is determined that the setting information is correct.

FIG. 14 illustrates an example of once holding writing information to the sensor register 311 in the memory (the register information storage 420) in the CIS 1, and reflecting the writing information only when it matches a CRC value or a MAC value. The setting value is reflected in the sensor register 311 only when the CRC value or the MAC value matches, which prevents the CIS 1 from operating on the basis of an unexpected value. The notification information such as the processing state FS_S_ACT or the error state FS_S_ERR may be outputted to the Read register of the functional safety and security data region 313, instead of the processing state output terminal 501 or the error output terminal 502. The notification information may be outputted to Embedded Data in the sensor data.

FIG. 15 illustrates a specific example of the writing determination unit 410A in the CIS 1 illustrated in FIG. 14.

The writing determination unit 410A includes the register communication detection unit 411, the data calculation unit 412, the error detection unit 413, the Write counter 414, and a register reflection determination unit 415.

The register communication detection unit 411 detects that the register communication has been performed. The data calculation unit 412 performs calculation related to CRC, MAC, encryption, and the like. The error detection unit 413 performs error detection based on a calculation result of the data calculation unit 412. The Write counter 414 counts that a writing request to the register 130 has been made, on the basis of a detection result of the register communication detection unit 411. The register reflection determination unit 415 determines whether or not to reflect the writing information to the sensor register 311, on the basis of a detection result of the error detection unit 413.

Figure 16:
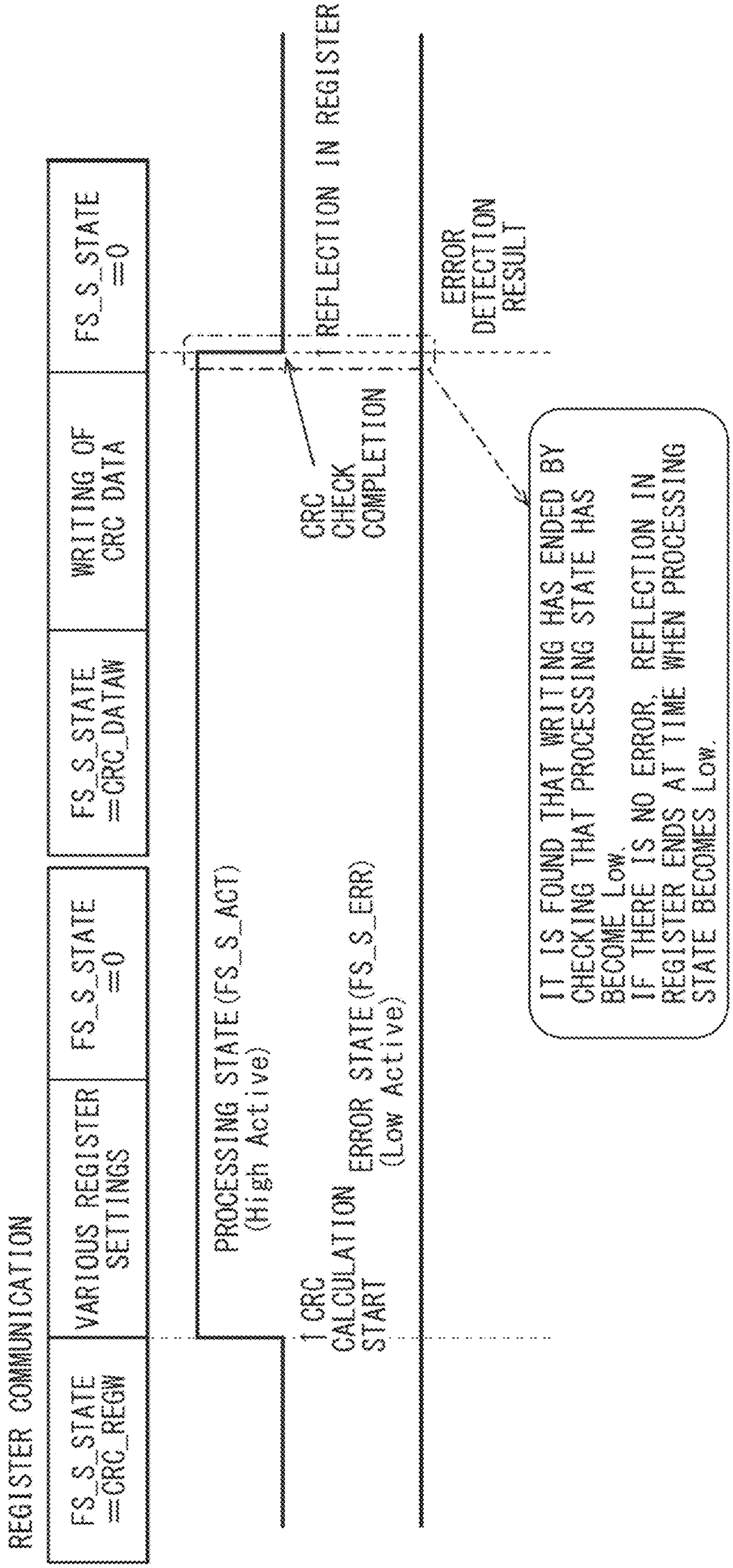
FIG. 16 is a sequence diagram illustrating an example of register communication in a CRC mode implemented by the configuration example illustrated in FIG. 15.

FIG. 16 is a sequence diagram illustrating an example of the register communication in the CRC mode implemented by the configuration example illustrated in FIG. 15.

It is found that writing of the setting value to the sensor register 311 has ended by checking that the processing state FS_S_ACT has become Low. If the error state FS_S_ERR is kept Low and no error is detected, reflection of the setting value in the sensor register 311 ends at a time when the processing state FS_S_ACT becomes Low.

(Example of Writing of Setting Information in Encryption Mode)

Figure 17:
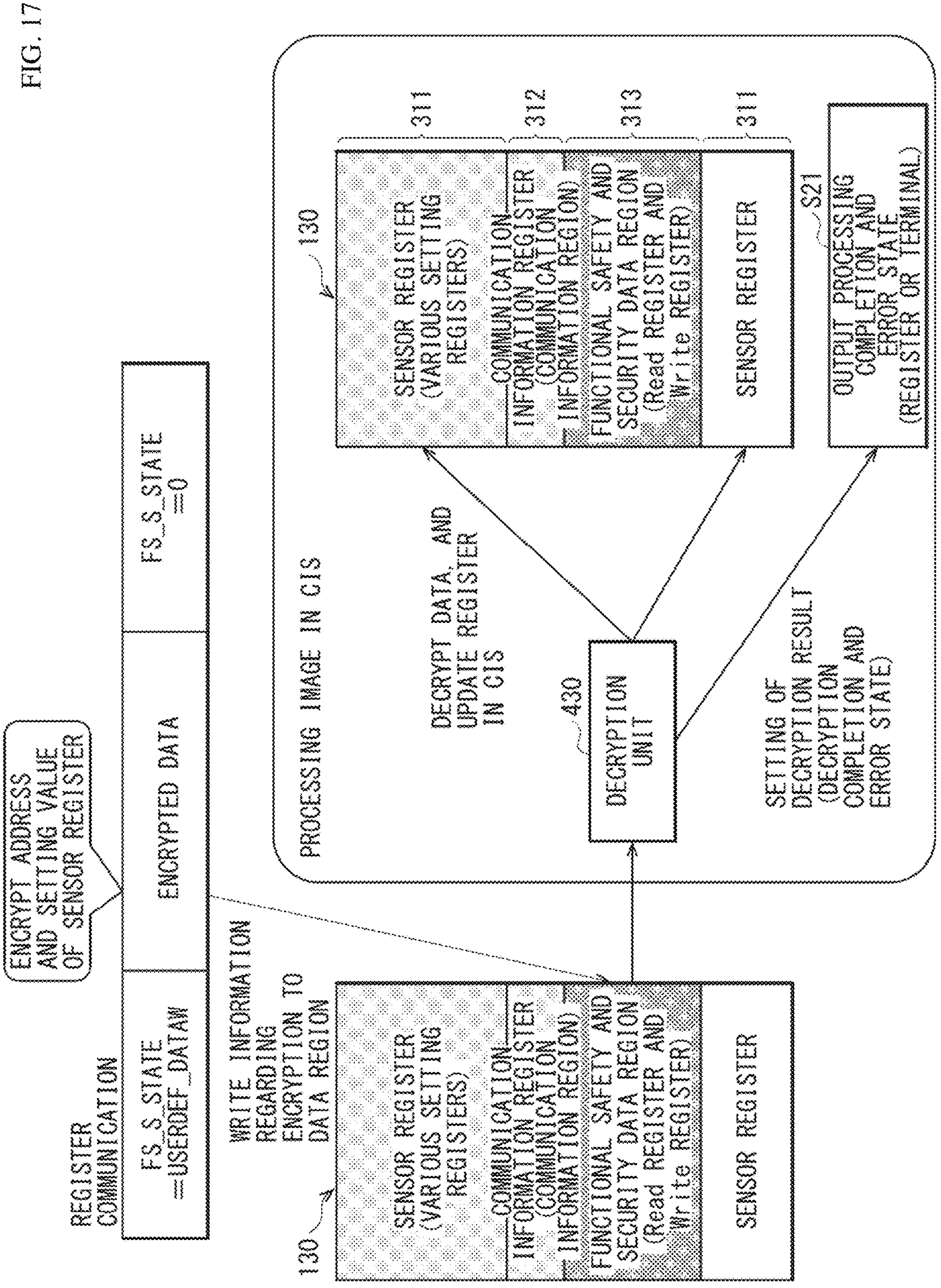
FIG. 17 is a sequence diagram illustrating an example of register communication in an encryption mode based on the technology according to one embodiment.

FIG. 17 is a sequence diagram illustrating an example of the register communication in the encryption mode based on the technology according to the embodiment.

FIG. 17 illustrates an example of the register communication in a case of encrypting the setting information to be written to the sensor register 311 in the encryption mode. FIG. 17 illustrates, in the lower right stage, a processing image in the CIS 1. The CIS 1 includes a decryption unit 430 that decrypts the encrypted data.

First, as the communication information, the status FS_S_STATE =USERDEF_DATAW indicating a start request for writing of the setting information to the sensor register 311 in the encryption mode is transmitted from the host 2 via the register IF. The CIS 1 performs single Write (writing) of the operation mode value (USERDEF_DATAW) to the FS_S_STETE register of the communication information register 312.

Next, the encrypted setting information is transmitted as the encrypted data from the host 2 via the register IF. Note that the setting value of the status FS_S_STATE=USERDEF_DATAW, and also the MAC data, the IV, etc. may be encrypted and transmitted together. The CIS 1 writes the encrypted data to the functional safety and security data region 313. Next, the CIS 1 performs decryption on the encrypted data with use of the decryption unit 430, and writes the setting information (the register address and the setting value) obtained by the decryption to the sensor register 311. Note that, in general, authentication (confirmation that data has not been tampered with) is also performed at the time of decryption. In addition, the CIS 1 provides processing completion notification indicating that decryption has been completed, by using the processing state FS_S_ACT (step S21). In a case where there is an error, the CIS 1 provides notification of the error information using the error state FS_S_ERR (step S21).

(Example of Reading of Setting Information in CRC Mode)

Figure 18:
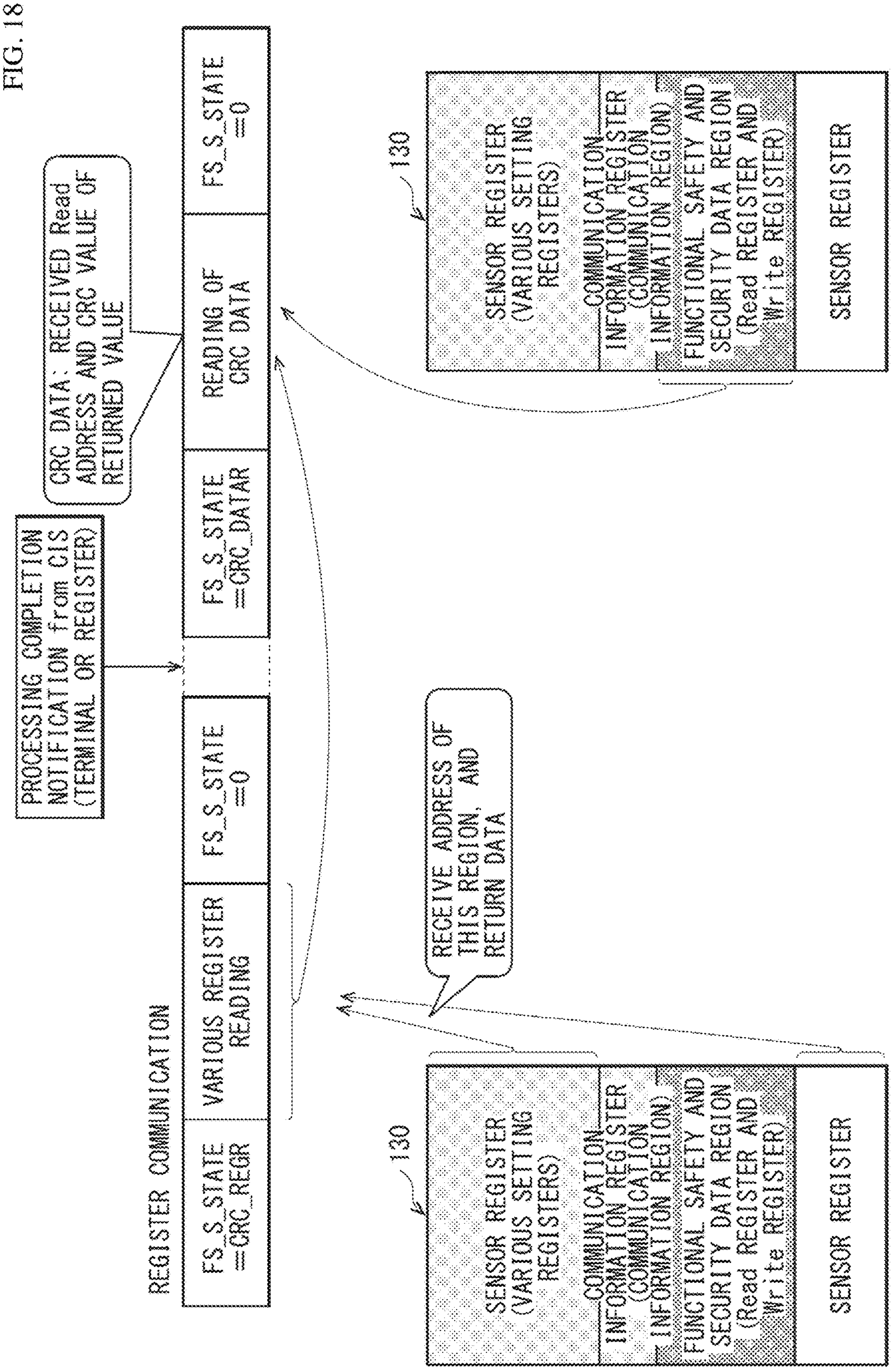
FIG. 18 is a sequence diagram illustrating an example of register communication in a case of performing reading on the basis of the technology according to one embodiment.

FIG. 18 is a sequence diagram illustrating an example of the register communication in a case of performing reading on the basis of the technology according to the embodiment.

FIG. 18 illustrates an example of the register communication in a case where a reading request for the setting information stored in the sensor register 311 is made from the host 2 in the CRC mode. Upon a reading request for the setting information made from the host 2, the CIS 1 reads the setting information stored in the sensor register 311, and the security data related to the setting information and stored in the functional safety and security data region 313, and transmits the read data to the host 2 via the register IF. Note that this basically similarly applies to operation in a case of performing reading in the MAC mode.

First, as the communication information, the status FS_S_STATE=CRC_REGR indicating a start request for reading of the setting information in the CRC mode is transmitted from the host 2 via the register IF. The CIS 1 performs single Write (writing) of the operation mode value (CRC_REGR) to the FS_S_STETE register of the communication information register 312. The CIS 1 reads the setting information stored in the sensor register 311, and transmits the read data to the host 2 via the register IF. The setting information includes, for example, the register address and the setting value of the sensor register 311 as a target of reading.

Next, as the communication information, the status FS_S_STATE=0 indicating an end request for reading of the setting information in the CRC mode is transmitted from the host 2 via the register IF. The CIS 1 sets the operation mode value of the FS_S_STETE register of the communication information register 312 to 0. Next, the CIS 1 provides completion notification indicating that reading processing has been completed, for example, by using the processing state FS_S_ACT. The notification may be provided by using the processing state output terminal 501 or the register IF.

Next, as the communication information, the status FS_S_STATE =CRC_DATAR indicating a start request for reading of the security data in the CRC mode is transmitted from the host 2 via the register IF. The CIS 1 performs single Write (writing) of the operation mode value (CRC_DATAR) to the FS_S_STETE register of the communication information register 312. Next, the CIS 1 generates the CRC data, and writes the CRC data to the functional safety and security data region 313. Next, the CIS 1 reads the CRC data from the functional safety and security data region 313, and transmits the CRC data as the security data to the host 2 via the register IF, The CRC data may include the register address and the CRC value of the sensor register 311 as a target of reading. As the security data, information necessary for processing other than CRC may also be transmitted. For example, mode information of CRC in a case with multiple algorithms may also be transmitted.

Next, as the communication information, the status FS_S_STATE=0 indicating an end request for reading of the security data in the CRC mode is transmitted from the host 2 via the register IF. The CIS 1 sets the operation mode value of the FS_S_STETE register of the communication information register 312 to 0.

(Example of Reading of Setting Information in Encryption Mode)

Figure 19:
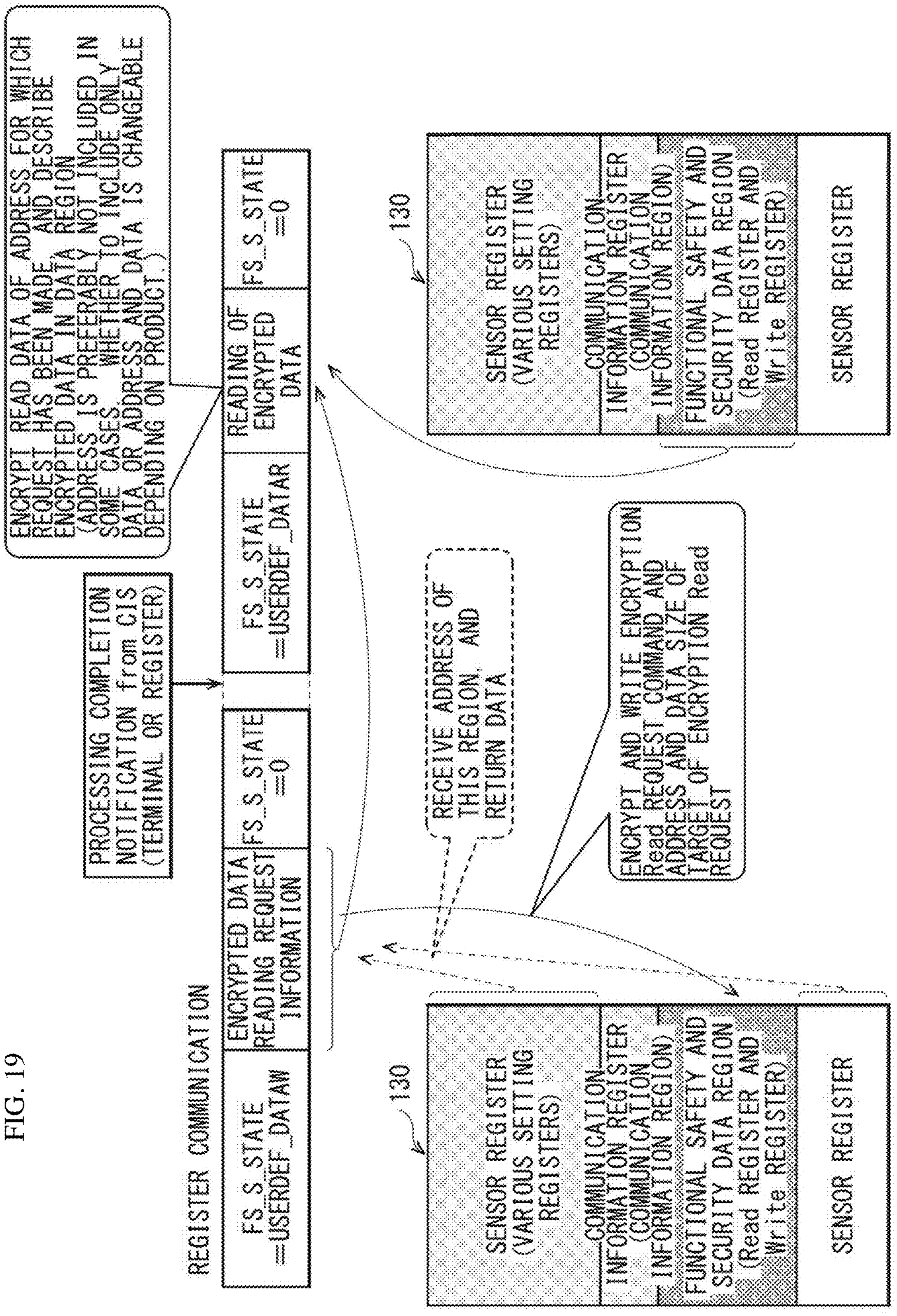
FIG. 19 is a sequence diagram illustrating an example of register communication in a case of performing reading in the encryption mode on the basis of the technology according to one embodiment.

FIG. 19 is a sequence diagram illustrating an example of the register communication in a case of performing reading in the encryption mode on the basis of the technology according to the embodiment.

FIG. 19 illustrates an example of the register communication in a case where a reading request for the setting information stored in the sensor register 311 is made from the host 2 in the encryption mode. Upon a reading request for the setting information in the encryption mode made from the host 2, the CIS 1 encrypts the setting information stored in the sensor register 311 and writes the encrypted setting information as the encrypted data to the functional safety and security data region 313, and thereafter reads the encrypted data from the functional safety and security data region 313.

First, as the communication information, the status FS_S_STATE =USERDEF_DATAW indicating a start request for writing of the setting information to the functional safety and security data region 313 in the encryption mode is transmitted from the host 2 via the register IF. The CIS 1 performs single Write (writing) of the operation mode value (USERDEF_DATAW) to the FS_S_STETE register of the communication information register 312. The CIS 1 reads the setting information stored in the sensor register 311, encrypts the setting information, and writes the encrypted setting information as the encrypted data to the functional safety and security data region 313. The encrypted data may include an encryption reading request command, and the address and a data size of the sensor register 311 as a target of the encryption reading request. The address is preferably not included in some cases. Whether or not the address is to be included depends on the product.

Next, as the communication information, the status FS_S_STATE=0 indicating an end request for writing is transmitted from the host 2 via the register IF. The CIS 1 sets the operation mode value of the FS_S_STETE register of the communication information register 312 to 0. Next, the CIS 1 provides completion notification indicating that writing processing has been completed, for example, by using the processing state FS_S_ACT. The notification may be provided by using the processing state output terminal 501 or the register IF.

Next, as the communication information, the status FS_S_STATE=USERDEF_DATAR indicating a start request (the encryption Read request command) for reading of the setting information in the encryption mode is transmitted from the host 2 via the register IF. The CIS 1 performs single Write (writing) of the operation mode value (USERDEF_DATAR) to the FS_S_STETE register of the communication information register 312. The CIS 1 reads the encrypted data from the functional safety and security data region 313, and transmits the encrypted data to the host 2 via the register IF.

Next, as the communication information, the status FS_S_STATE=0 indicating an end request for reading is transmitted from the host 2 via the register IF. The CIS 1 sets the operation mode value of the FS_S_STETE register of the communication information register 312 to 0.

(Notification Method for Notification Information)

Figure 20:
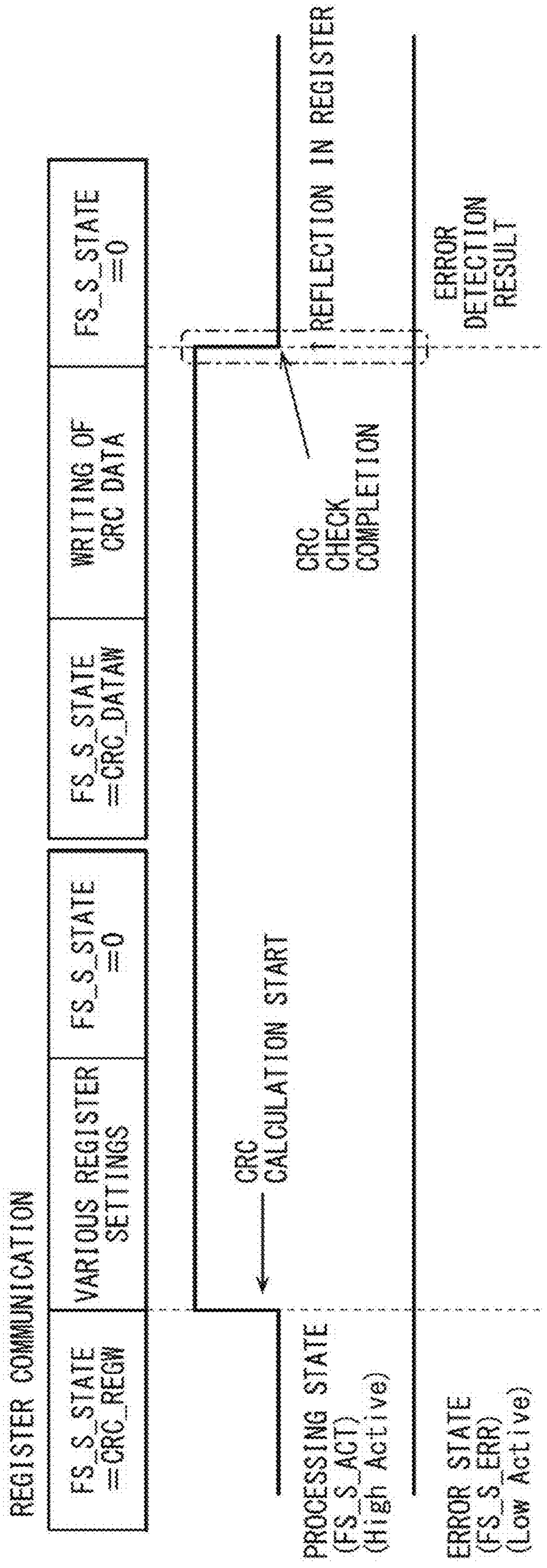
FIG. 20 is a sequence diagram illustrating an example of register communication based on the technology according to one embodiment.

FIG. 20 is a sequence diagram illustrating an example of the register communication based on the technology according to the embodiment. FIG. 20 illustrates an example of state notification in the CIS 1 in a case of performing writing of the setting information in the CRC mode.

As described above, the processing state FS_S_ACT, the error state FS_S_ERR, and counter information may be held by the register 130, or may be outputted from the processing state output terminal 501 and the error output terminal 502. Alternatively, they may be outputted as Embedded Data when the sensor data is outputted from the communication unit 120. A combination of these multiple methods may be used.

The processing state FS_S_ACT may be a processing state indicating that various requests are being accepted and processed in the CIS 1. The error state FS_S_ERR may be a state indicating that an error has been detected in the CIS 1. The error state FS_S_ERR may have multiple states for classification based on an error category. The error state FS_S_ERR may be changeable depending on the product.

(Communication Counter)

As illustrated in FIG. 24 and FIG. 26 described later, the CIS 1 may include a communication counter 416. The communication counter 416 may include a Write counter and a Read counter. The Write counter counts, for example, that a request for writing of the setting information to the sensor register 311 has been made from the host 2. The Read counter counts, for example, that a reading request for the setting information has been made from the host 2. Providing the Write counter and the Read counter separately makes it possible to monitor writing processing to the register 130 in changing the operation of the CIS 1, without consideration of processing such as polling of reading the processing status and the error information in the CIS 1 from the register 130. Note that the CIS 1 may have the Write counter and the Read counter integrated as one communication counter 416.

(Operation Example of Write Counter)

Figure 21:
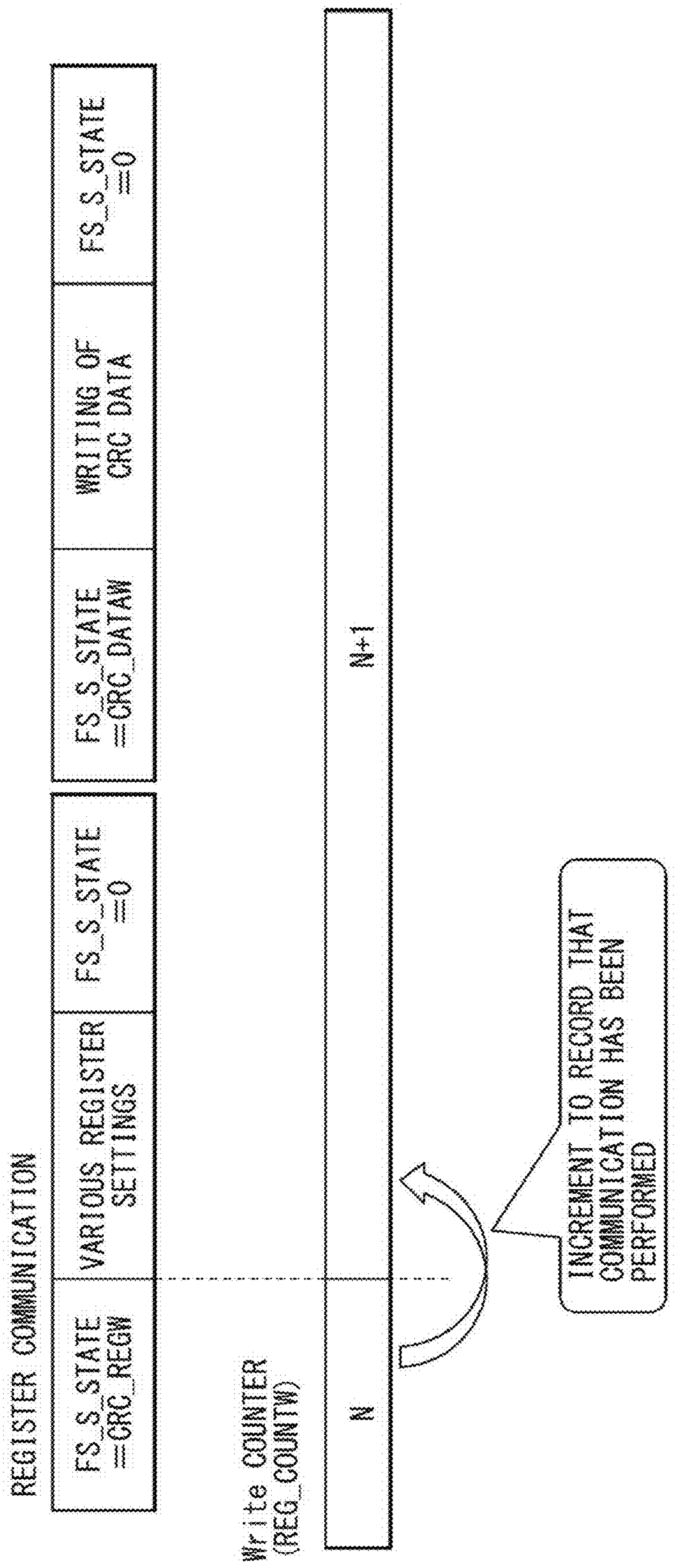
FIG. 21 is a sequence diagram illustrating an example of register communication including operation of a Write counter based on the technology according to one embodiment.

FIG. 21 is a sequence diagram illustrating an example of the register communication including operation of the Write counter based on the technology according to the embodiment. FIG. 21 illustrates an example of the register communication in a case of writing the setting information to the sensor register 311 in the CRC mode.

The Write counter (REG_COUNTW) increments a counter value, for example, at a timing when the register communication (FS_S_STATE=CRC_REGW) indicating a writing request is detected.

Note that the Write counter may be incremented even in a case where a check result of CRC or MAC indicates an error and the setting value is not reflected in the sensor register 311. Assumed is a case where different products take different measures, such as a case where some products "reflect the setting value if the check result of CRC or MAC is OK" and some products "reflect the setting value upon receiving the setting value, but provide notification that the check result of CRC indicates an error to an imaging result".

(Operation Example of Read Counter upon Reading Request)

Figure 22:
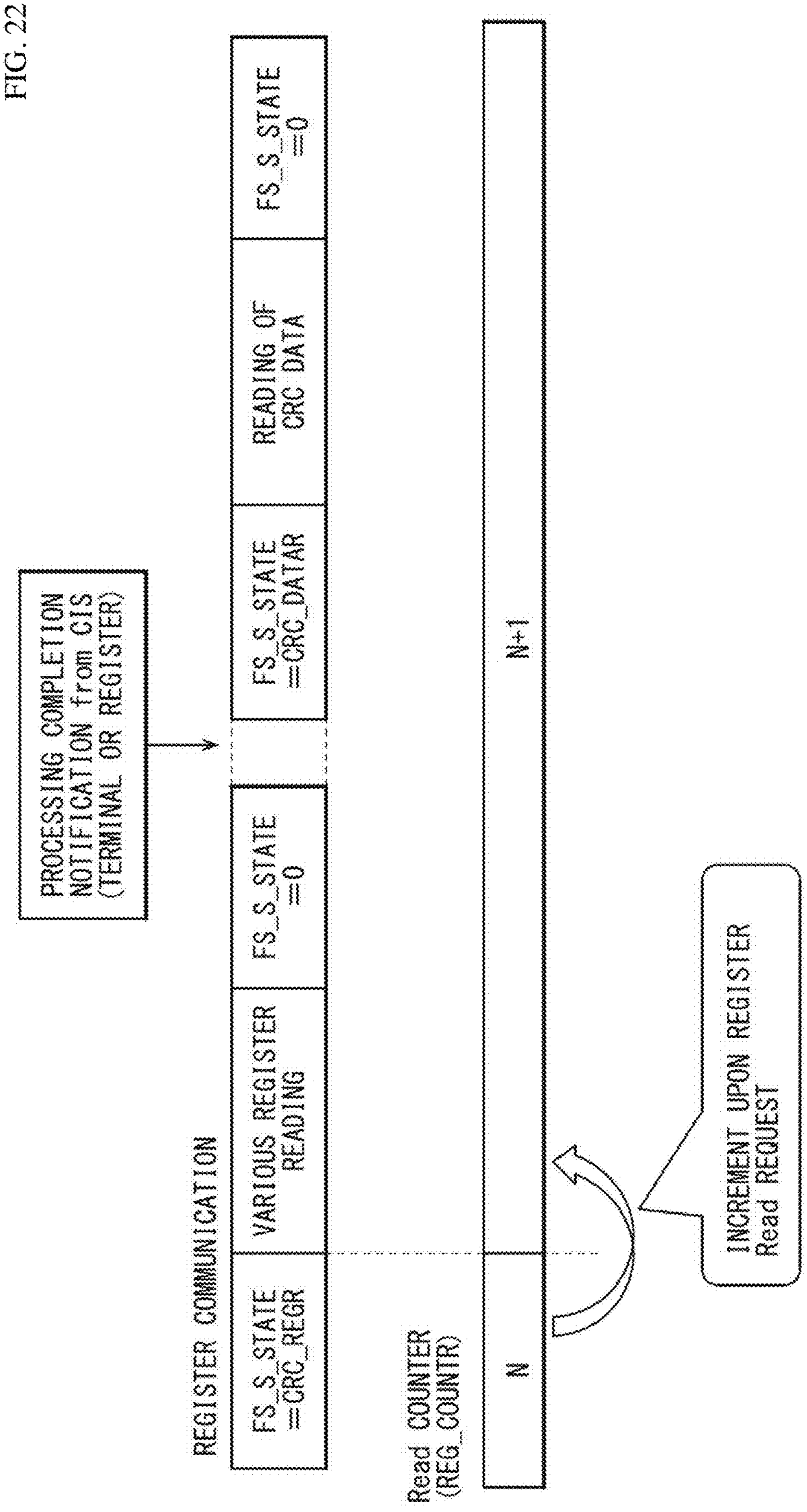
FIG. 22 is a sequence diagram illustrating an example of register communication including operation of a Read counter based on the technology according to one embodiment.

FIG. 22 is a sequence diagram illustrating an example of the register communication including operation of the Read counter based on the technology according to the embodiment. FIG. 22 illustrates an example of the register communication in a case where a reading request for the setting information stored in the sensor register 311 is made from the host 2 in the CRC mode.

The Read counter (REG_COUNTR) increments the counter value, for example, at a timing of starting reading of the setting information corresponding to the reading request (FS_S_STATE=CRC_REGR). For example, the Read counter may be incremented upon completion of preparation for reading at least one setting value. Note that the Read counter may be incremented even in a case where the check result of CRC or MAC indicates an error.

(Operation Example of Read Counter in Case of Performing Reading in Encryption Mode)

Figure 23:
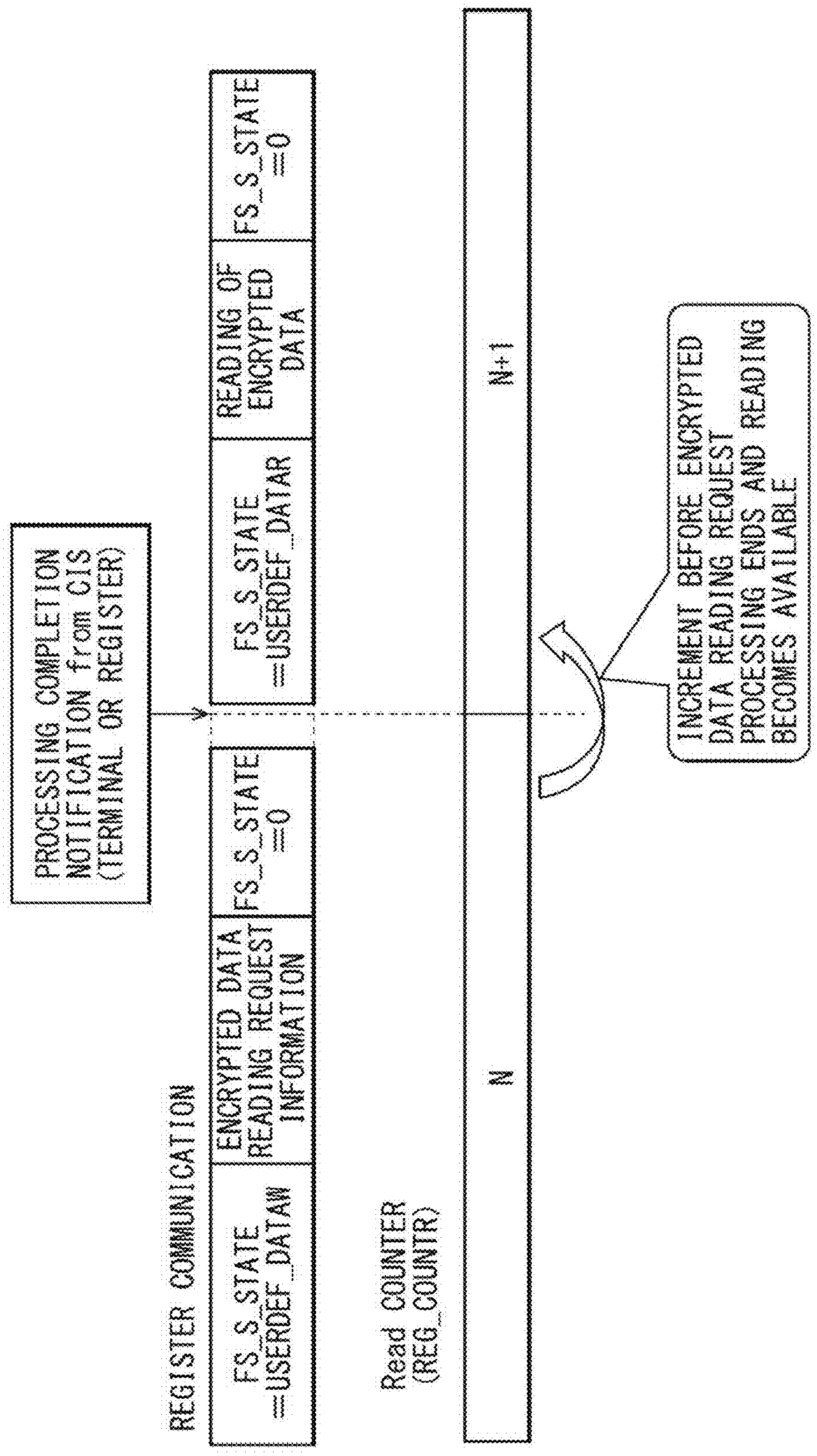
FIG. 23 is a sequence diagram illustrating an example of register communication including operation of the Read counter based on the technology according to one embodiment.

FIG. 23 is a sequence diagram illustrating an example of the register communication including operation of the Read counter based on the technology according to the embodiment. FIG. 23 illustrates an example of the register communication in a case where a reading request for the setting information stored in the sensor register 311 is made from the host 2 in the encryption mode.

For example, upon the reading request by encryption (FS_S_STATE=USERDEF_DATAW, USERDEF_DATAR), the Read counter (REG_COUNTR) increments the counter value, for example, after the setting information stored in the sensor register 311 is encrypted and written to the functional safety and security data region 313 as the encrypted data, before the encrypted data is read from the functional safety and security data region 313.

(Circuit Configuration Example 3)

FIG. 24 schematically illustrates a third configuration example of the CIS 1 serving as the data processing device according to the embodiment. FIG. 24 illustrates a configuration example in a case of, after writing the setting value to the sensor register 311, determining whether or not the written value is a correct value by, for example, CRC.

In the third configuration example illustrated in FIG. 24, the CIS 1 includes the communication unit 110, the communication unit 120, the data processing unit 123, the sensor unit 124, the register 130, the writing determination unit 410, the processing state output terminal 501, and the output terminal 502. In addition, the CIS 1 includes an overall control unit 40, the register communication detection unit 411, the data calculation unit 412, the error detection unit 413, and a communication counter 413.

The communication counter 416 includes the Write counter and the Read counter. The sensor unit 124 includes a pixel unit 41, an ADC (analog-digital converter) 42, and a pixel control unit 43.

In the third configuration example illustrated in FIG. 24, the register communication detection unit 411, the data calculation unit 412, and the error detection unit 413 are easily constructable and easily changeable later by the CPU 131 (FIG. 1).

The communication unit 120 serving as the data output unit adds the notification information such as the error information and the counter value from the communication counter 416 to the sensor data subjected to various data processing in the data processing unit 123, and outputs the sensor data to the host 2. The communication unit 120 adds the notification information and the counter value to Embedded Data in the sensor data, for example, at a timing synchronized with the synchronization timing signal for the sensor data. In addition, the counter value of the communication counter 416 may be outputted to the register 130.

In a case of employing a method of reflecting the setting value in the sensor register 311 before checking by CRC or MAC, adding the notification information, the counter value, and the state to the sensor data and outputting the sensor data makes it possible for the host 2 to determine in what kind of situation the CIS 1 is operating. It is ideal to reflect the setting value after checking by CRC or MAC, but a configuration of performing reflection of the setting value in a normal manner and thereafter merely checking whether or not communication has been correct makes it is possible to reduce a load of the processing inside the CIS 1.

(Operation Example of Write Counter)

(Circuit Configuration Example 4)

Figure 25:
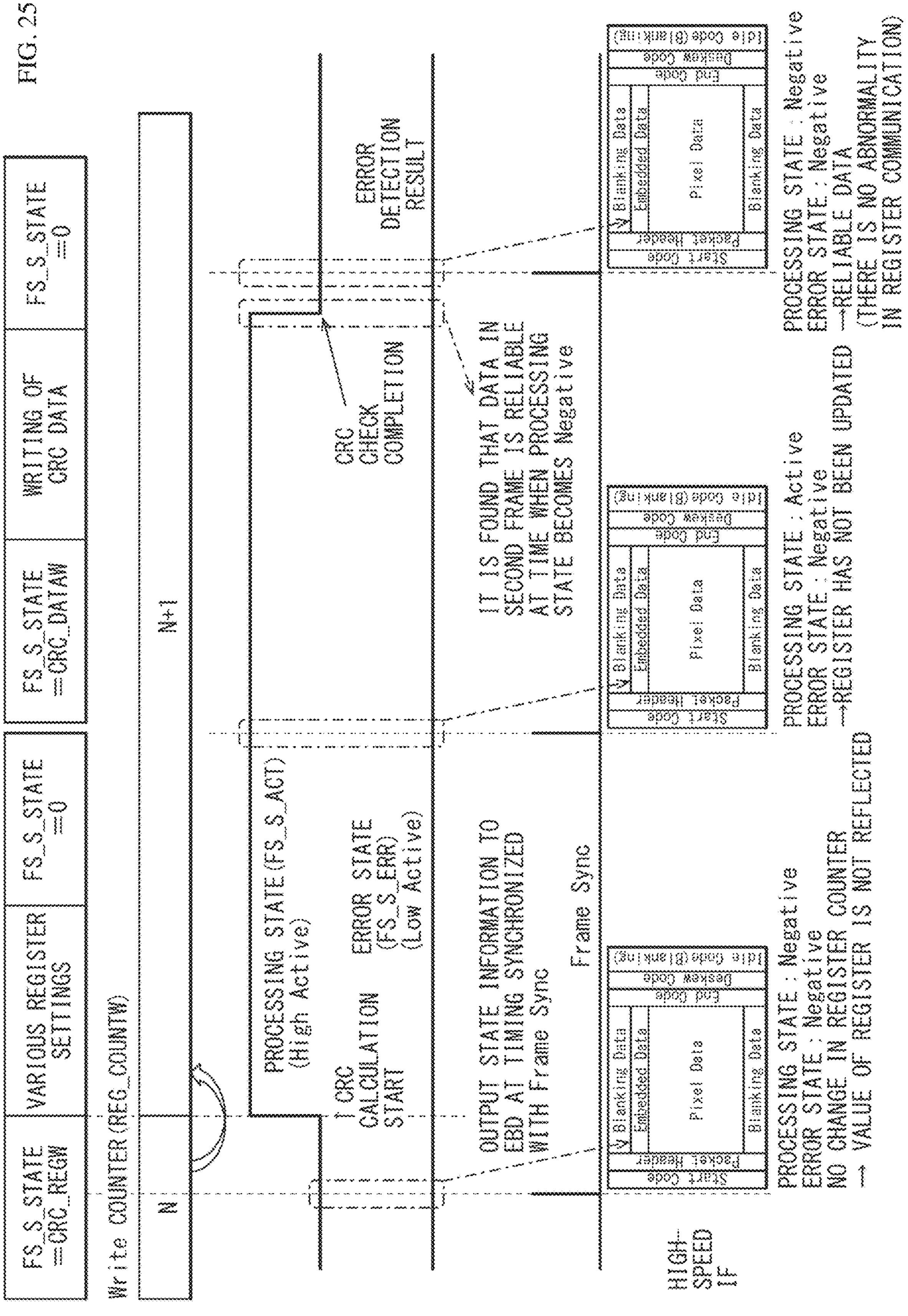
FIG. 25 is a sequence diagram illustrating an example of register communication including operation of the Write counter based on the technology according to one embodiment.

FIG. 25 is a sequence diagram illustrating an example of the register communication including operation of the Write counter based on the technology according to the embodiment. FIG. 25 illustrates an example of the register communication in a case of writing the setting information to the sensor register 311 in the CRC mode.

FIG. 26 schematically illustrates a configuration example for implementation of the processing illustrated in FIG. 25, as a fourth configuration example of the CIS 1 serving as the data processing device according to the embodiment.

In the fourth configuration example illustrated in FIG. 26, the CIS 1 includes the communication unit 110, the communication unit 120, the data processing unit 123, the sensor unit 124, the register 130, the writing determination unit 410, the processing state output terminal 501, and the output terminal 502. In addition, the CIS 1 includes the overall control unit 40, the register communication detection unit 411, the data calculation unit 412, the error detection unit 413, the communication counter 413, and the register reflection determination unit 415.

In the fourth configuration example illustrated in FIG. 26, the register communication detection unit 411, the data calculation unit 412, the error detection unit 413, and the register reflection determination unit 415 are easily constructable and easily changeable later by the CPU 131 (FIG. 1).

FIG. 25 illustrates an example of once holding the writing information to the sensor register 311 in the memory in the CIS 1, and reflecting the setting value in the sensor register 311 only when it matches the CRC value or the MAC value. Note that this similarly applies to operation in a case of the MAC mode.

The notification information such as the processing state FS_S_ACT or the error state FS_S_ERR may be outputted to the Read register of the functional safety and security data region 313, instead of the processing state output terminal 501 or the error output terminal 502. The notification information may be outputted to Embedded Data in the sensor data.

The Write counter (REG_COUNTW) increments the counter value, for example, at a timing when the register communication (FS_S_STATE=CRC_REGW) indicating a writing request is detected.

FIG. 25 illustrates, in the bottom stage, an example of the frame format of the sensor data. The communication unit 120 serving as the data output unit adds the notification information such as the error information and the counter value from the communication counter 416 to the sensor data subjected to various data processing in the data processing unit 123, and outputs the sensor data to the host 2. The communication unit 120 adds the notification information and the counter value to Embedded Data in the sensor data, for example, at a timing synchronized with the synchronization timing signal for the sensor data. In addition, the counter value of the communication counter 416 may be outputted to the register 130. Outputting the notification information and the counter value allows the host 2 to find whether or not the new setting value is reflected in the CIS 1.

In the example of FIG. 25, it is found whether or not the sensor data in a second frame is reliable at a time when the processing state FS_S_ACT becomes Negative. The host 2 finds whether or not the setting information has been transmitted successfully by checking the error state FS_S_ERR at a time when the processing state FS S ACT becomes Low.

In the example of FIG. 25, in a first frame, the processing state FS_S ACT is Negative, the error state FS_S_ERR is Negative, and there is no change in the register counter. Thus, it is found that the setting value is not reflected in the sensor register 311.

In the second frame, the processing state FS_S_ACT is Active, the error state FS_S_ERR is Negative, and it is found that the setting value for the sensor register 311 has not been updated.

In a third frame, the processing state FS_S_ACT is Negative, the error state FS_S_ERR is Negative, and it is possible to determine that the data is reliable data (there is no abnormality in the register communication).

(Operation Example of Write Counter)

Figure 27:
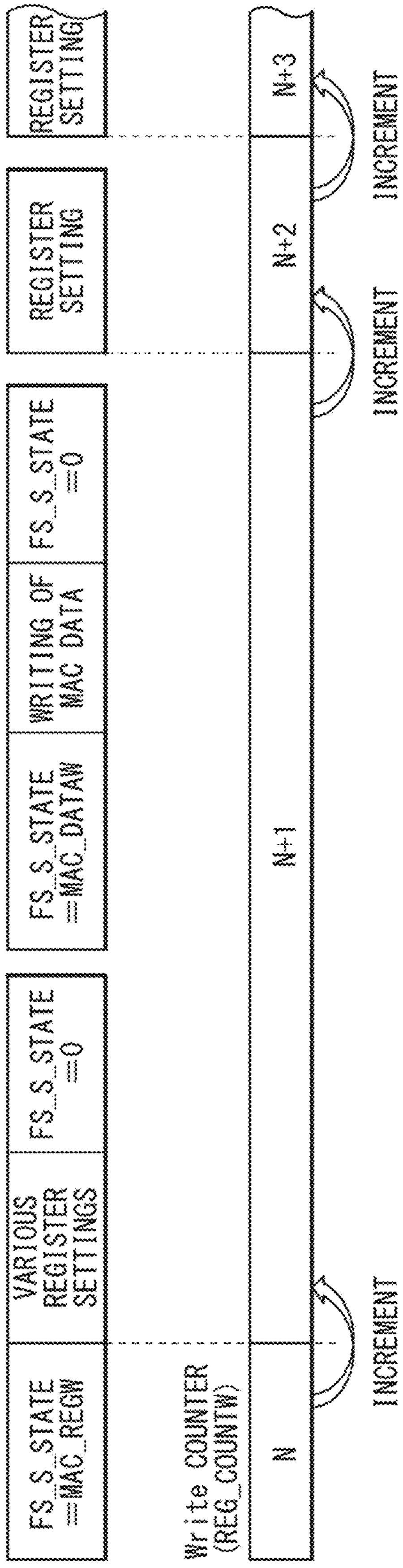
FIG. 27 is a sequence diagram illustrating an example of register communication including operation of the Write counter based on the technology according to one embodiment.

FIG. 27 is a sequence diagram illustrating an example of the register communication including operation of the Write counter based on the technology according to the embodiment. FIG. 27 illustrates an example of the register communication in a case of writing the setting information to the sensor register 311 in the MAC mode.

The Write counter (REG_COUNTW) increments the counter value, for example, at a timing when the register communication (FS_S_STATE=MAC_REGW) indicating a writing request is detected.

Even in a case where the register communication in which the communication information (FS_S_STATE) is not set is performed between the host 2 and the register 130, the Write counter may increment the counter value of the communication counter 416 in communication transfer units of the register communication. Thus, it is possible to detect that communication not protected by a functional safety and security function has been performed. However, this does not provide enough safety and security, and it is thus desired to determine the communication-allowed mode for each register region in the CIS 1 or the register 130, and configure the register 130 not to be updatable unless the mode is used.

(Modification Example of Register Map)

FIG. 28 illustrates a modification example of the configuration (the register map) of the register 130 based on the technology according to the embodiment.

The register 130 may include, as the sensor register 311, a security target region for predetermined security processing, and writing of the setting information to the security target region or reading of the setting information from the security target region may be configured to be permitted in a case of performing the predetermined security processing. It is desired that setting of each region be determined in advance at, for example, the time of startup or manufacture of the product, and configured not to be dynamically changeable.

For example, multiple writings in one region may be permitted, like "writing by MAC or encryption available" or "writing by CRC or MAC available". Designation of the region may be fixed at the time of design of the CIS 1, may be switchable by the Fuse or the like at the time of manufacture of the product, or may be set, for example, at the time of startup.

Here, in a case of "writing by MAC or encryption available", a region to be subjected to authentication (checking by MAC) may also allow for access using the encrypted data because, for example, authentication is generally performed together in a case of decrypting the encrypted data. In a case of "writing by CRC or MAC available", it is possible to detect a change in data due to data noise also by MAC.

For example, a partial region of the sensor register 311 may be a MAC region, as illustrated in FIG. 28. The MAC region may store, for example, writing data from the host 2 to the CIS 1 dependent on the environment such as the exposure time, or reading data including the environment information such as the temperature information.

In addition, for example, the communication information register 312 may be a region where reading and writing are available without performing MAC or encryption. There is no restriction in this case. However, it is possible to perform checking by CRC or MAC, for example, in a case where whether the value is correct is to be verified at the time of reading.

In addition, a partial region of the sensor register 311 may be an encryption region. For example, dictionary information of an AI (artificial intelligence) mounted function sensor, reading data including the environment information such as the temperature information, and other information such as operation mode information may serve as privacy information depending on an installation environment, and may be encrypted and stored in the encryption region.

(Operation Example of Write Counter)

Figure 29:
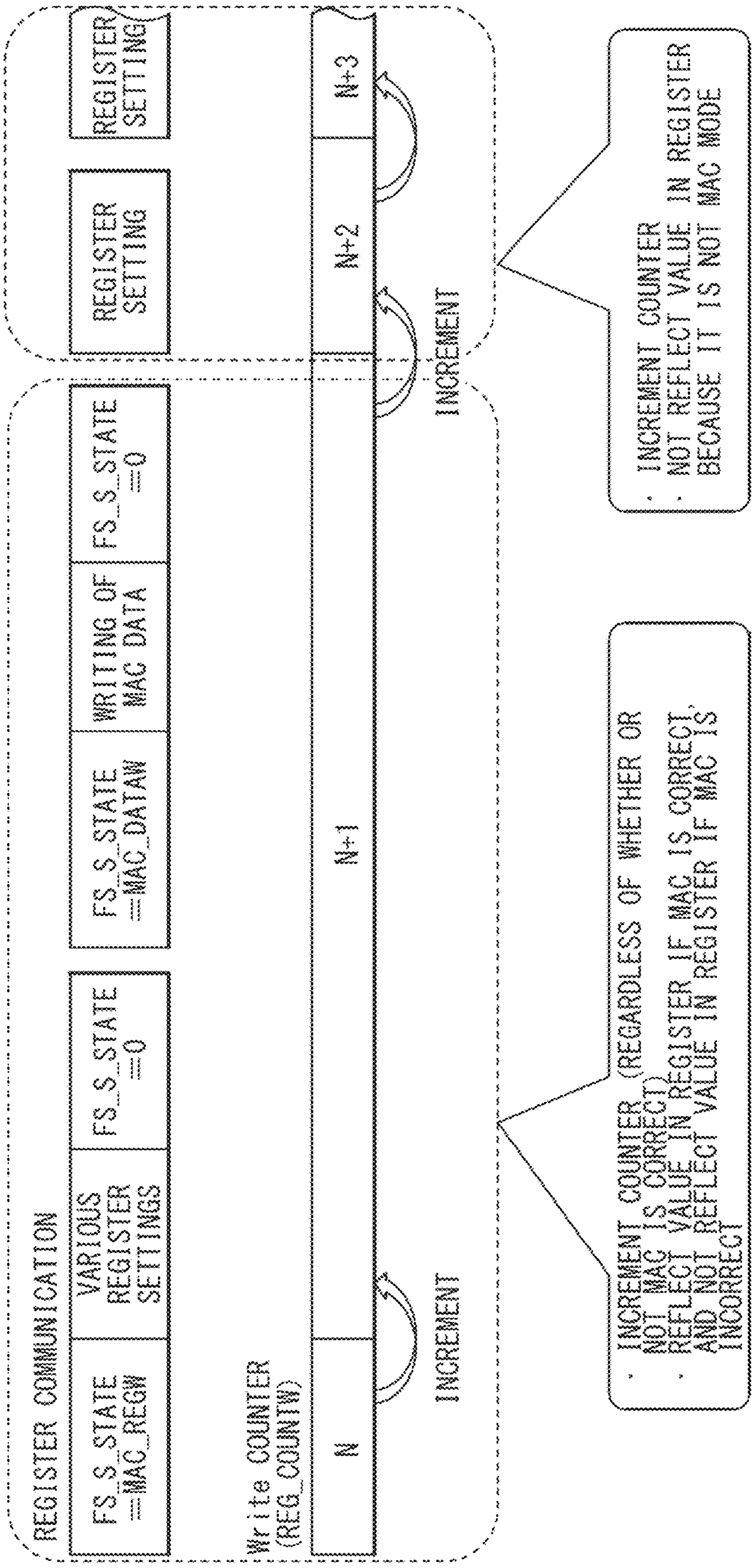
FIG. 29 is a sequence diagram illustrating an example of register communication including operation of the Write counter based on the technology according to one embodiment.

FIG. 29 is a sequence diagram illustrating an example of the register communication including operation of the Write counter based on the technology according to the embodiment. FIG. 29 illustrates an example of the register communication in a case of writing the setting information to the sensor register 311 in the MAC mode.

Even in a case where the register communication in which the communication information (FS_S_STATE) is not set is performed between the host 2 and the register 130, the Write counter may increment the counter value of the communication counter 416 in communication transfer units of the register communication. Thus, it is possible to detect that communication not protected by a functional safety and security function has been performed. Together with this function, writing of the setting information to the sensor register 311 may be configured not to be reflected in a case where the register communication in which the communication information is not set is performed between the host 2 and the register 130. This allows for more safe and secure communication.

FIG. 29 illustrates an example in a case where the CIS 1 is put into the MAC mode and configured not to reflect the setting value unless MAC is correct in advance. In a case where the register communication in the MAC mode is performed, the Write counter is incremented regardless of whether or not the MAC value is correct. In this case, the value is reflected in the register 130 if the MAC value is correct, and the value is not reflected in the register 130 if the MAC value is incorrect.

In a case where the register communication in which the communication mode (FS_S_STATE) is not set is performed, the counter is incremented in the communication transfer units. In this case, the value is not reflected in the register 130 because it is not the MAC mode.

(Example of Transmitting Mode Information)

Figure 30:
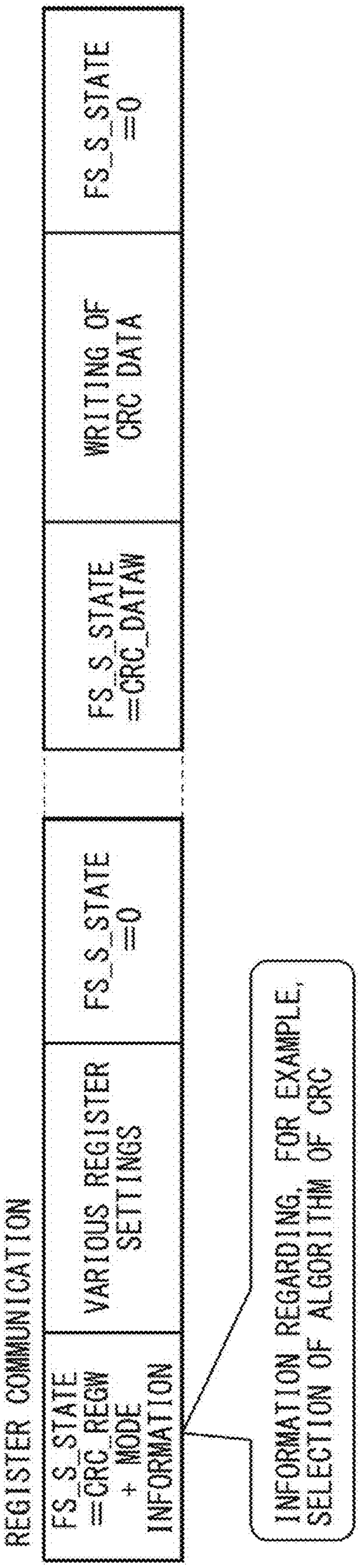
FIG. 30 is a sequence diagram illustrating an example of register communication based on the technology according to one embodiment.

FIG. 30 is a sequence diagram illustrating an example of the register communication based on the technology according to the embodiment. FIG. 30 illustrates an example of the register communication in a case of writing the setting information to the sensor register 311 in the CRC mode.

In the technology according to the embodiment, before writing or reading the setting information to or from the sensor register 311, communication mode information including information regarding the algorithm corresponding to desired security processing may be configured to be transmitted as the communication information from the host 2.

FIG. 30 illustrates an example of the register communication in a case of changing the operation mode of CRC in accordance with an amount of data to be transmitted in the "various register settings". Transmitting information regarding the operation mode of CRC in advance makes it possible for the CIS 1 to select processing corresponding to a length of data. The information regarding the operation mode of CRC may be information regarding, for example, selection of the algorithm of CRC (e.g., switching information between CRC16 and CRC32).

To indicate the mode information, a bit width of FS_S_STATE may be expanded as a mode register, or the register region in the communication information register 312 may have, as the mode register, a new register region, for example, a register region that stores FS_S_MODE or the like. That is, as the mode register, two kinds of register regions that store FS_S_STATE and FS_S_MODE may be provided.

(Expansion Example of Mode Register)

Figure 31:
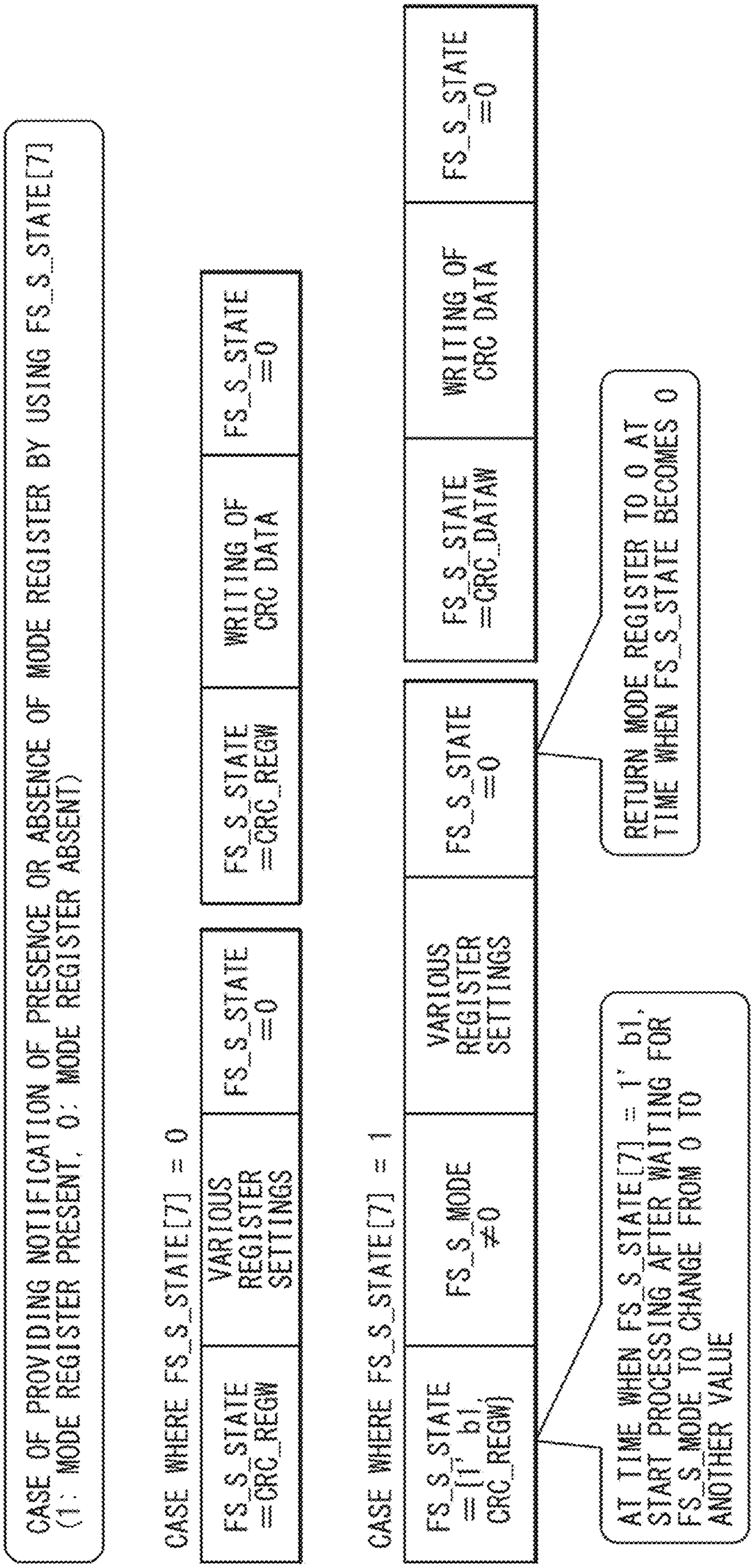
FIG. 31 is a sequence diagram illustrating an example of register communication based on the technology according to one embodiment.

FIG. 31 is a sequence diagram illustrating an example of the register communication based on the technology according to the embodiment. FIG. 31 illustrates an example of the register communication in a case of writing the setting information to the sensor register 311 in the CRC mode.

Information indicating that the communication information includes the communication mode information may be transmitted from the host 2. For example, in a case of providing notification of the communication mode information by using the mode register, the host 2 may use the bit of FS_S_STATE to notify the CIS 1 whether or not the mode register is present.

FIG. 31 illustrates an example in a case of providing notification of presence or absence of the mode register by using FS_S_STATE[7] (1: mode register present, 0: mode register absent). FIG. 31 illustrates, in the upper stage, an example in which FS_S_STATE[7]=0.

FIG. 31 illustrates, in the lower stage, an example in a case where FS_S_STATE[7]=1. As commands, FS_S_STATE={1'b1, CRC_REGW} and FS_S_MODE≠0 are transmitted from the host 2. At a time when FS_S_STATE[7]=1'b1 is transmitted, the CIS 1 starts processing after waiting for FS_S_MODE to change from 0 to another value (FS_S_MODE≠0). At a time when FS_S_STATE becomes 0, the mode register is returned to 0.

(Example of Transmitting Security Data Earlier)

Figure 32:
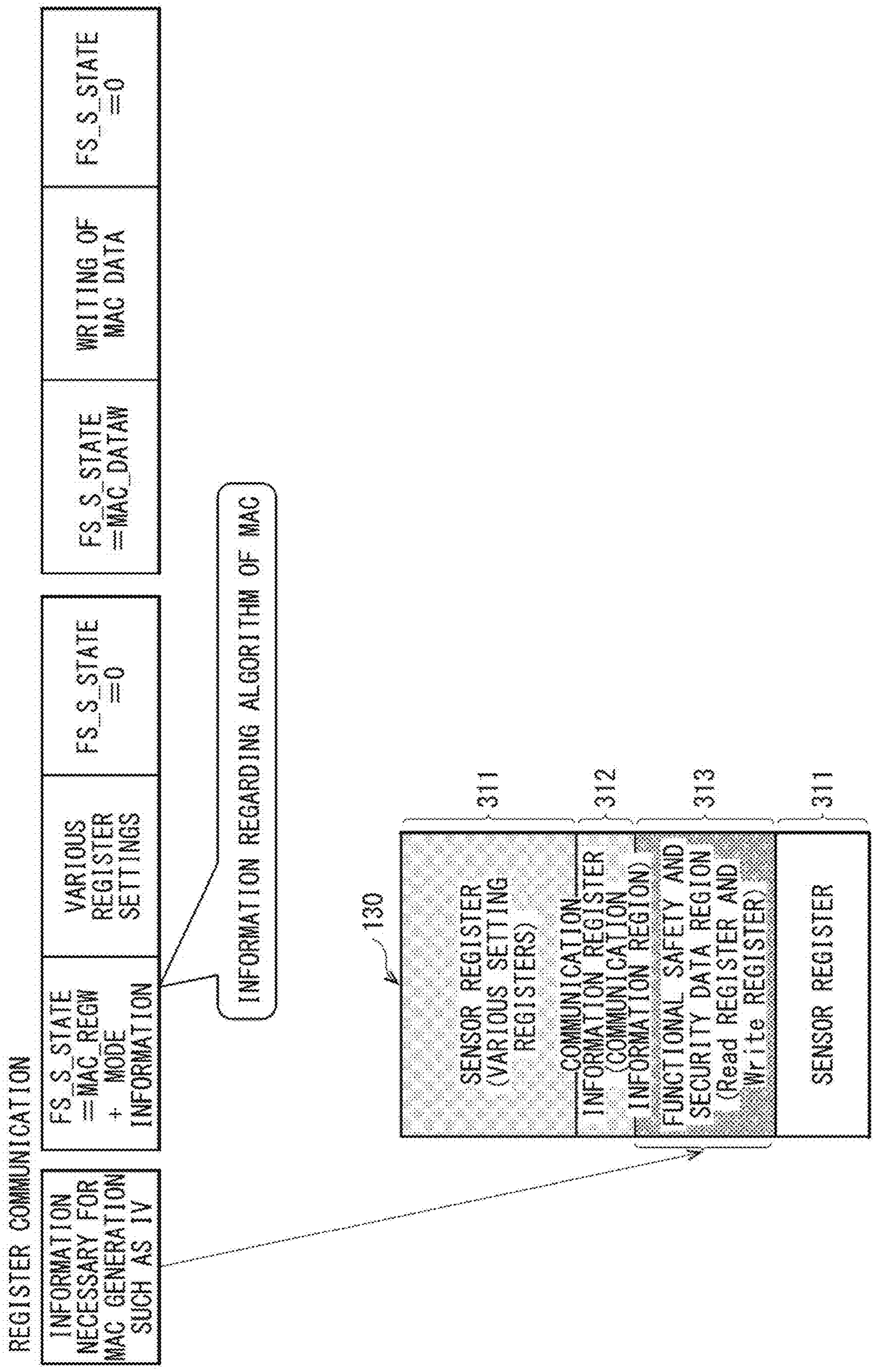
FIG. 32 is a sequence diagram illustrating an example of register communication based on the technology according to one embodiment.

FIG. 32 is a sequence diagram illustrating an example of the register communication based on the technology according to the embodiment. FIG. 32 illustrates an example of the register communication in a case of writing the setting information to the sensor register 311 in the MAC mode.

In the CIS 1, before the communication information is transmitted from the host 2, information to be used for the desired security processing is transmitted from the host 2, and the information to be used for the desired security processing may be written to the functional safety and security data region 313 as the security data.

For example, as the security data, information necessary for processing other than MAC may also be transmitted from the host 2. For example, information such as mode information of MAC in a case with multiple algorithms or the IV in a case of using GMAC may also be transmitted. In this case, information such as the IV may be transmitted earlier from the host 2. In a case where the security data is a large amount of data of several bytes or more, writing a portion of the data to the functional safety and security data region 313 in advance makes it possible to effectively use the register region, and also to perform calculation of MAC in parallel with the register communication (in parallel with various register communication times).

(Example of Providing Expected Value Register)

Figure 33:
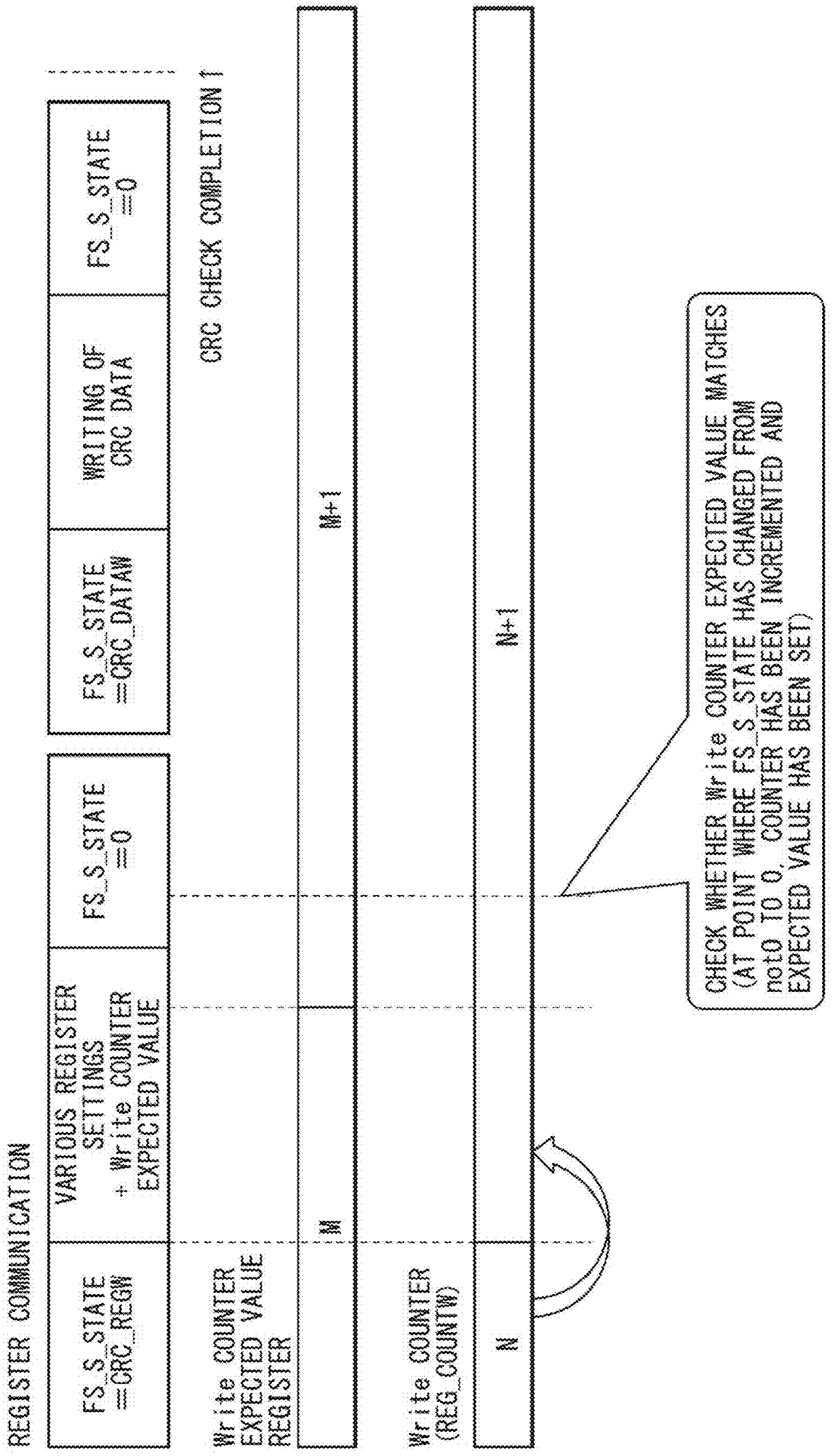
FIG. 33 is a sequence diagram illustrating an example of register communication including operation of the Write counter based on the technology according to one embodiment.

FIG. 33 is a sequence diagram illustrating an example of the register communication including operation of the Write counter based on the technology according to the embodiment. FIG. 33 illustrates an example of the register communication in a case of writing the setting information to the sensor register 311 in the CRC mode.

The setting information transmitted from the host 2 may include a counter expected value for the counter value of the Write counter. The register 130 may include a Write counter expected value register that stores the Write counter expected value.

The CIS 1 compares the value of the Write counter and the Write counter expected value, for example, at a timing when FS_S_STATE changes from not0 to 0. At a point where FS_S_STATE has changed from not0 to 0, the counter of the Write counter expected value register has been incremented and the expected value has been set. Thus, it is possible to set the Write counter expected value register as a target of checking by CRC or MAC as with a normal register region.

Figure 34:
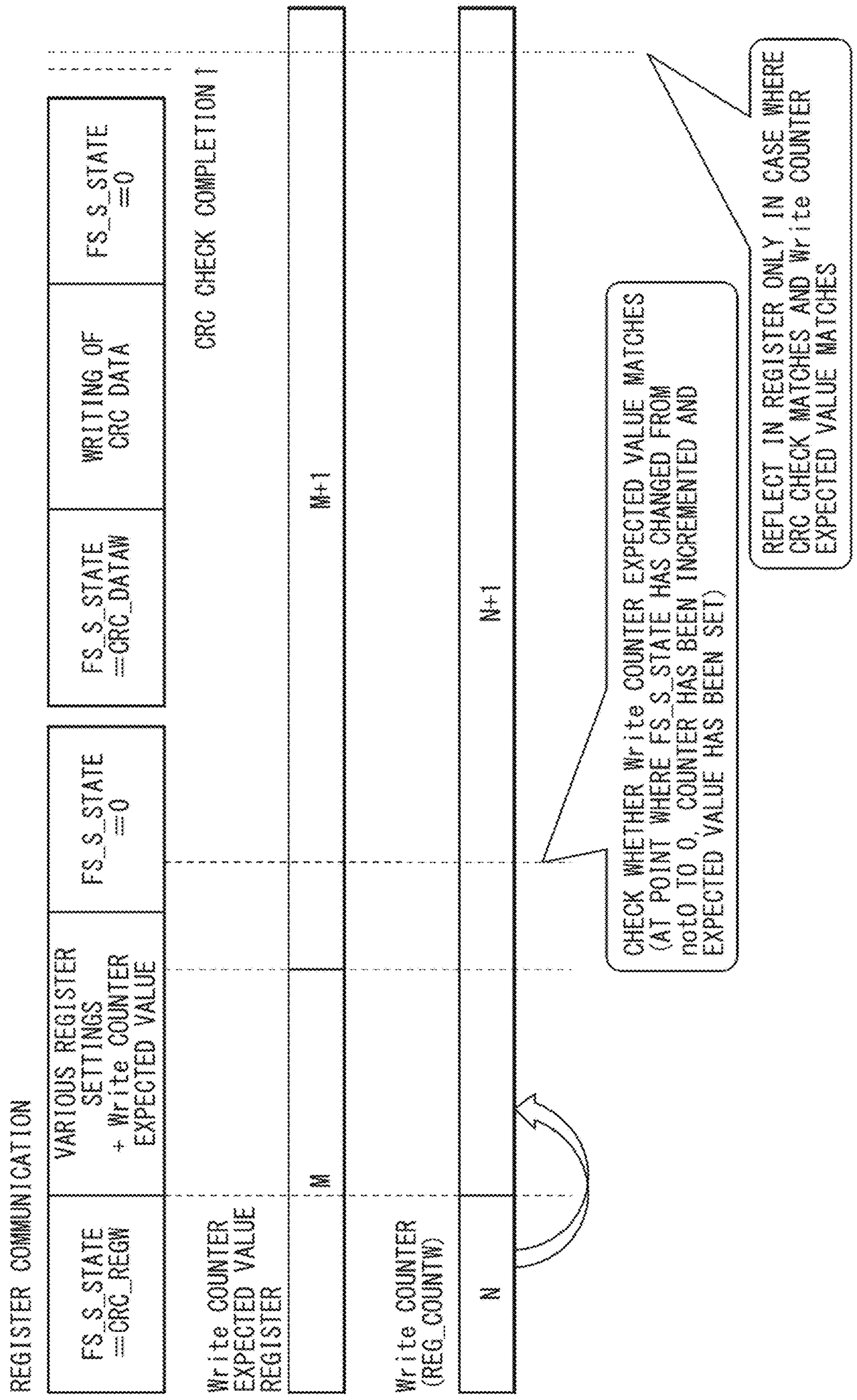
FIG. 34 is a sequence diagram illustrating an example of register communication including operation of the Write counter based on the technology according to one embodiment.

FIG. 34 is a sequence diagram illustrating an example of the register communication based on the technology according to the embodiment. FIG. 34 is a sequence diagram illustrating an example of the register communication including operation of the Write counter based on the technology according to the embodiment.

The CIS 1 may include the register information storage 420 (FIG. 14) as the temporary storage unit that temporarily stores the setting information transmitted from the host 2. The writing determination unit 410A of the CIS 1 may perform correctness determination of the setting information stored in the temporary storage unit, on the basis of the security data, and reflect writing of the setting information in the sensor register 311 in a case where it is determined that the setting information is correct and where the counter value of the Write counter and the counter expected value stored in the Write counter expected value register match.

For example, the setting value may be written (the register value may be reflected) only in a case where the CRC value or the MAC value matches and the Write counter expected value also matches.

(Variation Example 1 of Error Detection)

Figure 35:
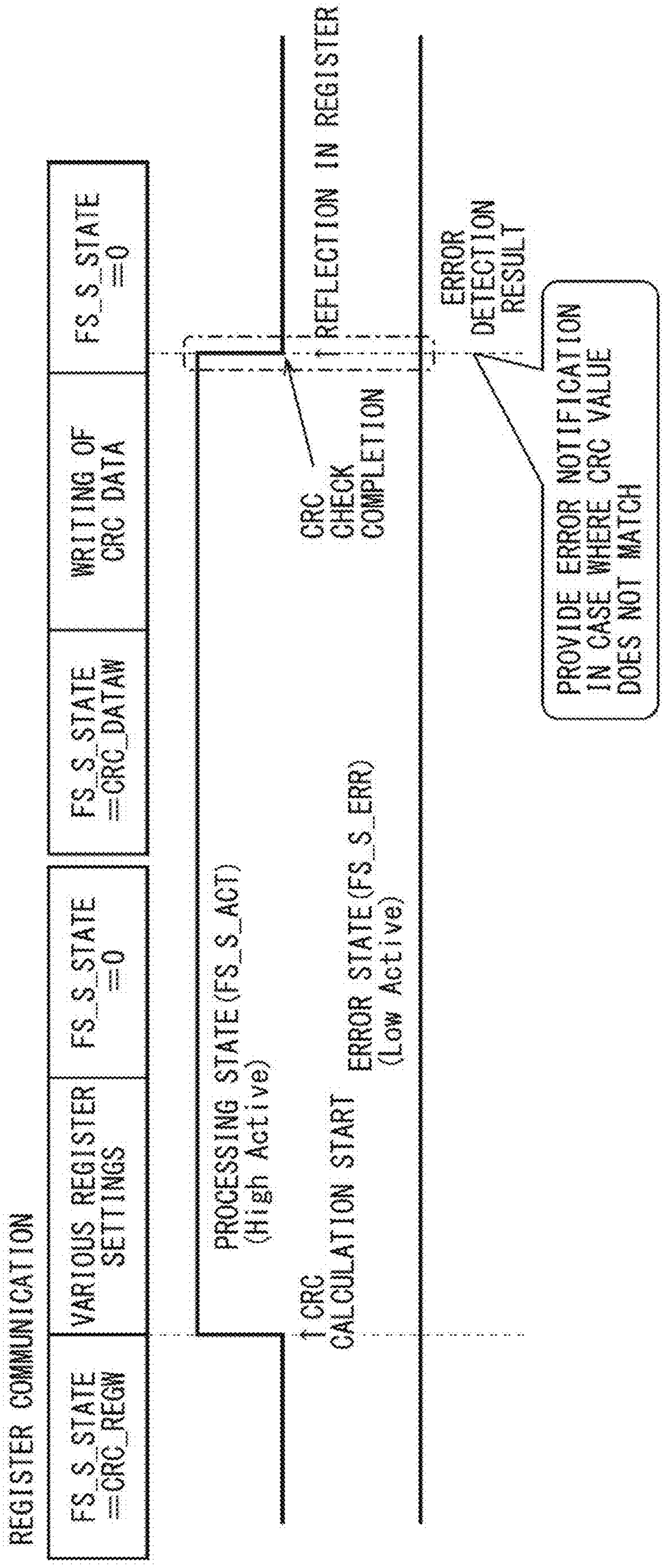
FIG. 35 is a sequence diagram illustrating an example of register communication based on the technology according to one embodiment.

FIG. 35 is a sequence diagram illustrating an example of the register communication based on the technology according to the embodiment. FIG. 35 illustrates an example of state notification in the CIS 1 in a case of performing writing of the setting information in the CRC mode.

FIG. 35 illustrates, as error detection, an example of error detection by normal operation. The CIS 1 finds that writing of the setting value to the sensor register 311 has ended by checking that the processing state FS_S_ACT has become Low. If the error state FS S_ERR is kept Low and no error is detected, reflection of the setting value in the sensor register 311 ends at a time when the processing state FS_S_ACT becomes Low.

The CIS 1 performs correctness determination of the setting information on the basis of the security data (the CRC data or the MAC data), and in a case where it is determined that the setting information is erroneous, outputs the error information as the notification information by using the error state FS_S ERR.

(Variation Example 2 of Error Detection)

Figure 36:
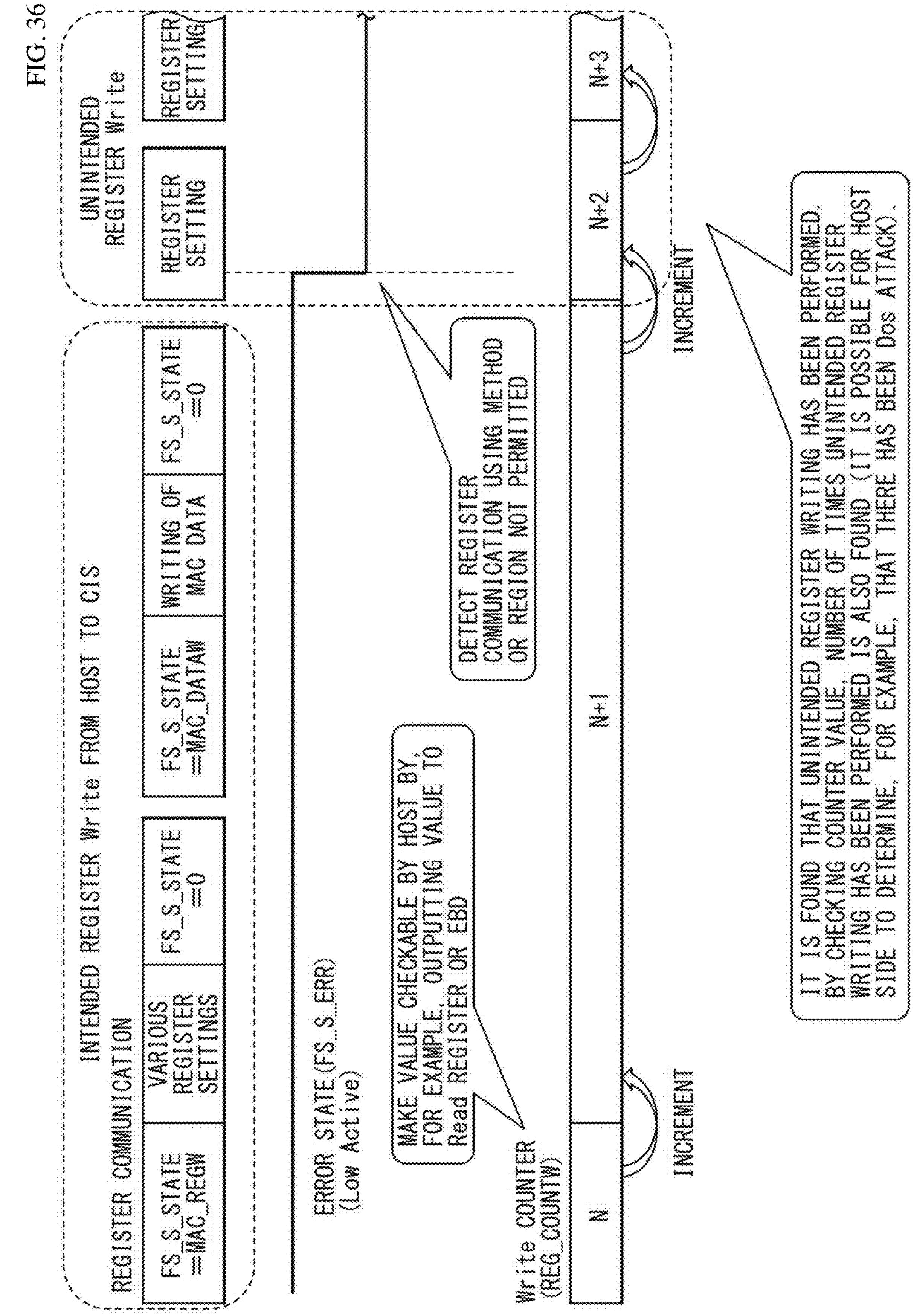
FIG. 36 is a sequence diagram illustrating an example of register communication including operation of the Write counter based on the technology according to one embodiment.

FIG. 36 is a sequence diagram illustrating an example of the register communication including operation of the Write counter based on the technology according to the embodiment.

In a case where unintended register communication in which the communication information is not set is performed between the host 2 and the register 130, the CIS 1 may output the error information as the notification information.

For example, in a case where a writing or reading request for a register region where the communication mode is designated or limited is made to the register 130, the error information may be outputted assuming that unexpected or undefined processing has been performed.

FIG. 36 illustrates an example in which the register communication related to intended writing of the setting information in the MAC mode from the host 2 to the CIS 1 is performed, and thereafter the register communication for unintended writing is performed. For example, the CIS 1 detects an error in a case where the register communication is performed without setting MAC_REGW as FS_S_STATE, The Write counter (REG COUNTW) increments the counter value, for example, at a timing when the register communication (FS_S_STATE=MAC_REGW) indicating a writing request is detected. Even in a case where the register communication in which the communication information (FS_S_STATE) is not set is performed between the host 2 and the register 130, the Write counter increments the counter value of the communication counter 416 in communication transfer units of the register communication. Thus, it is possible to detect that communication not protected by a functional safety and security function has been performed. The counter value may be outputted to Embedded Data in the sensor data. The counter value may be outputted to the register 130. Thus, it is possible for the host 2 to indirectly find that unintended writing has been performed. In addition, checking the counter value makes it possible to also find the number of times unintended register writing has been performed. It is possible for the host 2 side to determine, for example, that there has been a Dos attack.

(Variation Example 3 of Error Detection)

Figure 37:
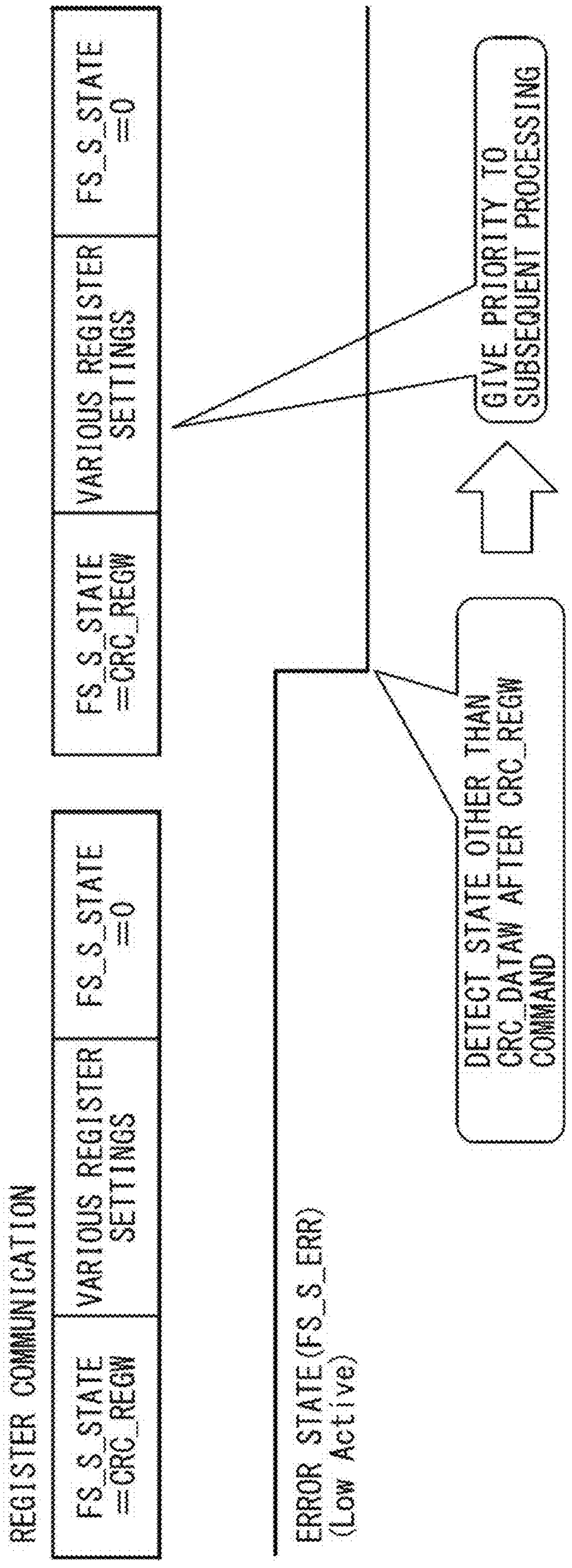
FIG. 37 is a sequence diagram illustrating an example of register communication based on the technology according to one embodiment.

FIG. 37 is a sequence diagram illustrating an example of the register communication based on the technology according to the embodiment. FIG. 37 illustrates an example of the register communication in a case of writing the setting information to the sensor register 311 in the CRC mode.

In a case where the register communication based on an unintended command different from the command indicated by the communication information is performed between the host 2 and the register 130, the CIS 1 may output the error information as the notification information.

FIG. 37 illustrates an example in which error detection due to a sequence fault is performed. Examples of the sequence fault include a case where, after register Write, the writing command of CRC or MAC does not occur and a different command is issued. In a case where the sequence fault is detected, preceding processing that has ended midway may be reset, and subsequent processing may be given priority, as illustrated in FIG. 37. FIG. 37 illustrates an example in a case where the writing command (FS_S_STATE=CRC_DATAW) of CRC does not occur, after issuance of the command (FS_S_STATE=CRC_REGW) indicating a writing request for the setting information.

(Variation Example 4 of Error Detection)

Figure 38:
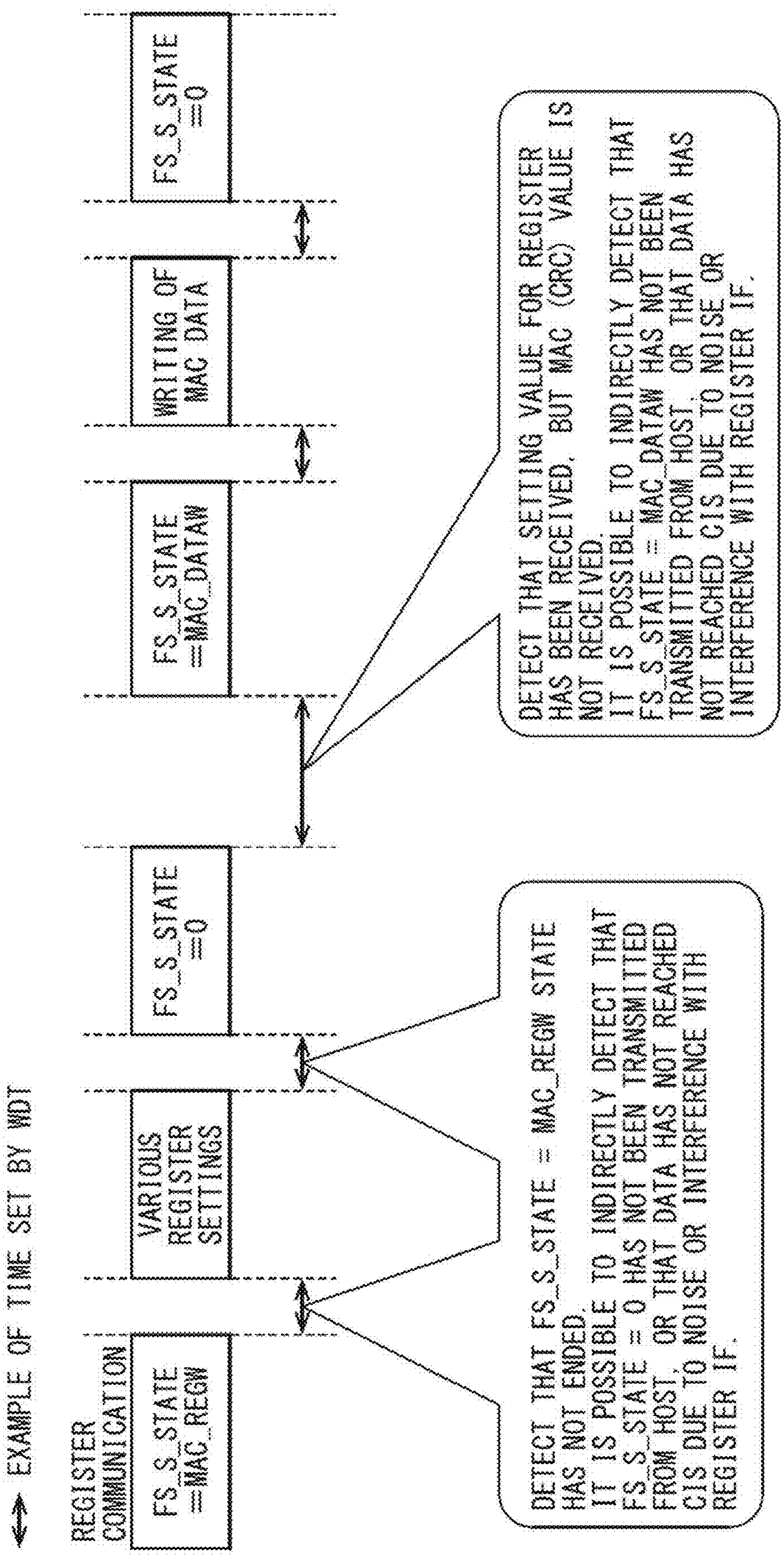
FIG. 38 is a sequence diagram illustrating an example of register communication based on the technology according to one embodiment.

FIG. 38 is a sequence diagram illustrating an example of the register communication based on the technology according to the embodiment. FIG. 38 illustrates an example of the register communication in a case of writing the setting information to the sensor register 311 in the MAC mode.

In a case where a command is not transmitted by the register communication from the host 2 within a predetermined period, the CIS 1 may output the error information as the notification information.

For example, the CIS 1 may have a WDT (watchdog timer), as a timer that sets an upper limit (MAX) time of processing, and provide the error notification upon detection that the upper limit time has been exceeded. The upper limit value may be fixed at the time of design of the CIS 1, may be switchable by the Fuse or the like at the time of manufacture of the product, or may be set, for example, at the time of startup.

By error detection by providing the upper limit time of each processing by using the WDT or the like, it is possible to indirectly detect an error in a case where there is erroneous operation in, for example, the control on the host 2 side or the transmission by the communication IF, and a normal command is not successfully transmitted.

In the example of FIG. 38, it is detected that processing of FS_S_STATE=MAC_REGW has not ended. Thus, it is possible to indirectly detect that FS_S_STATE=0 has not been transmitted from the host 2, or that the data has not reached the CIS 1 due to noise or interference with the register IF.

In addition, in the example of FIG. 38, it is detected that the setting value for the register 130 has been received, but the MAC (CRC) value is not received. It is possible to indirectly detect that FS_S_STATE=MAC_DATAW has not been transmitted from the host 2, or that the data has not reached the CIS 1 due to noise or interference with the register IF.

(Variation Example 5 of Error Detection)

Figure 39:
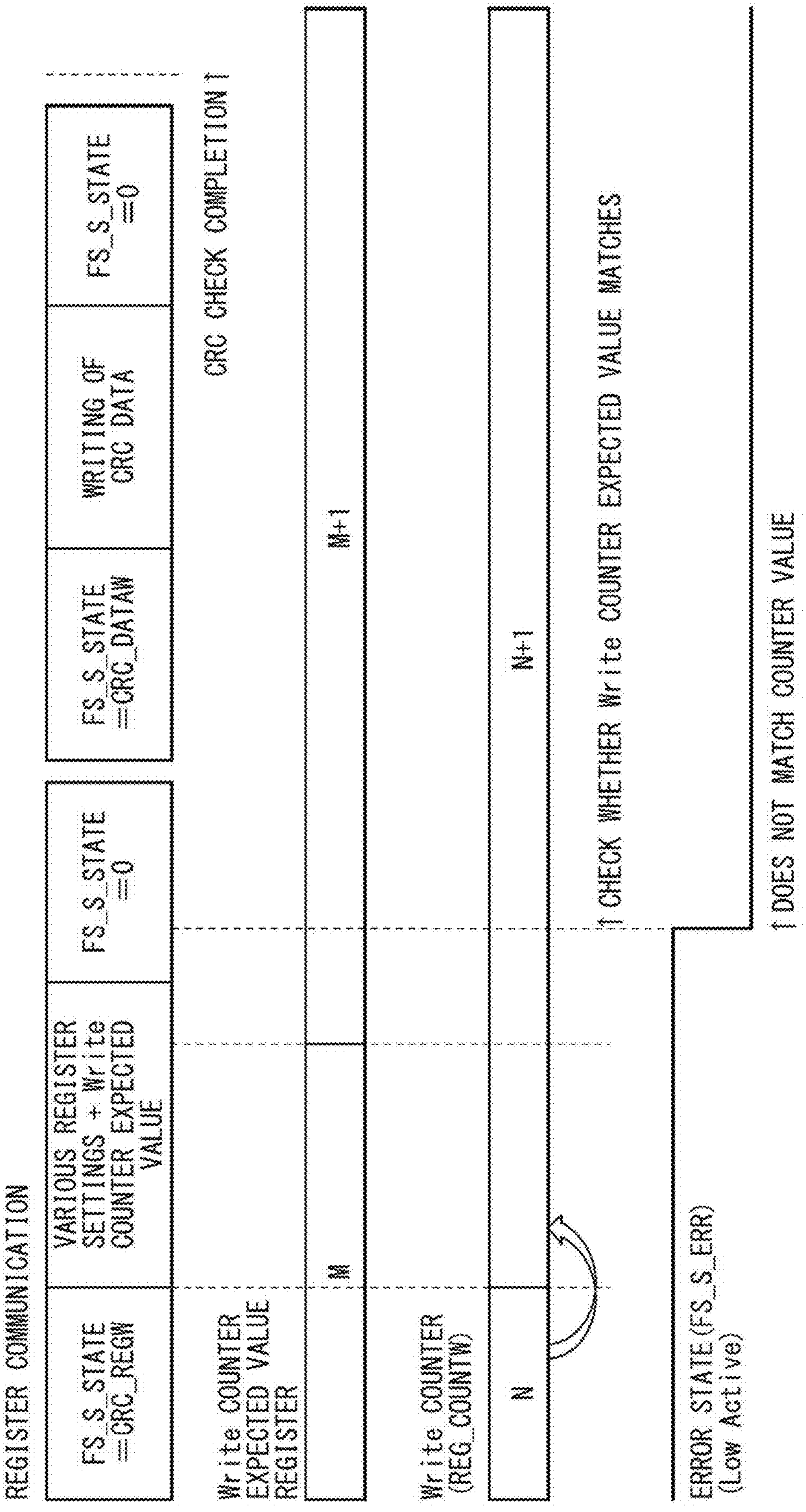
FIG. 39 is a sequence diagram illustrating an example of register communication including operation of the Write counter based on the technology according to one embodiment.

FIG. 39 is a sequence diagram illustrating an example of the register communication including operation of the Write counter based on the technology according to the embodiment. FIG. 33 illustrates an example of the register communication in a case of writing the setting information to the sensor register 311 in the CRC mode.

The setting information transmitted from the host 2 may include the counter expected value for the counter value of the Write counter. The register 130 may include the Write counter expected value register that stores the Write counter expected value.

The CIS 1 compares the value of the Write counter and the Write counter expected value, for example, at a timing when FS_S_STATE changes from not0 to 0. At a point where FS_S_STATE has changed from not0 to 0, the counter of the Write counter expected value register has been incremented and the expected value has been set. Thus, it is possible to set the Write counter expected value register as a target of checking by CRC or MAC as with a normal register region.

In a case where the counter value of the Write counter and the counter expected value stored in the expected value register do not match, the CIS 1 may output the error information as the notification information by using the error state FS_S_ERR. This method may be performed at the time of reading as well as writing. Thus, it is possible to cope with a replay attack or the like.

(Other Matters Related to Error Detection)

Figure 40:
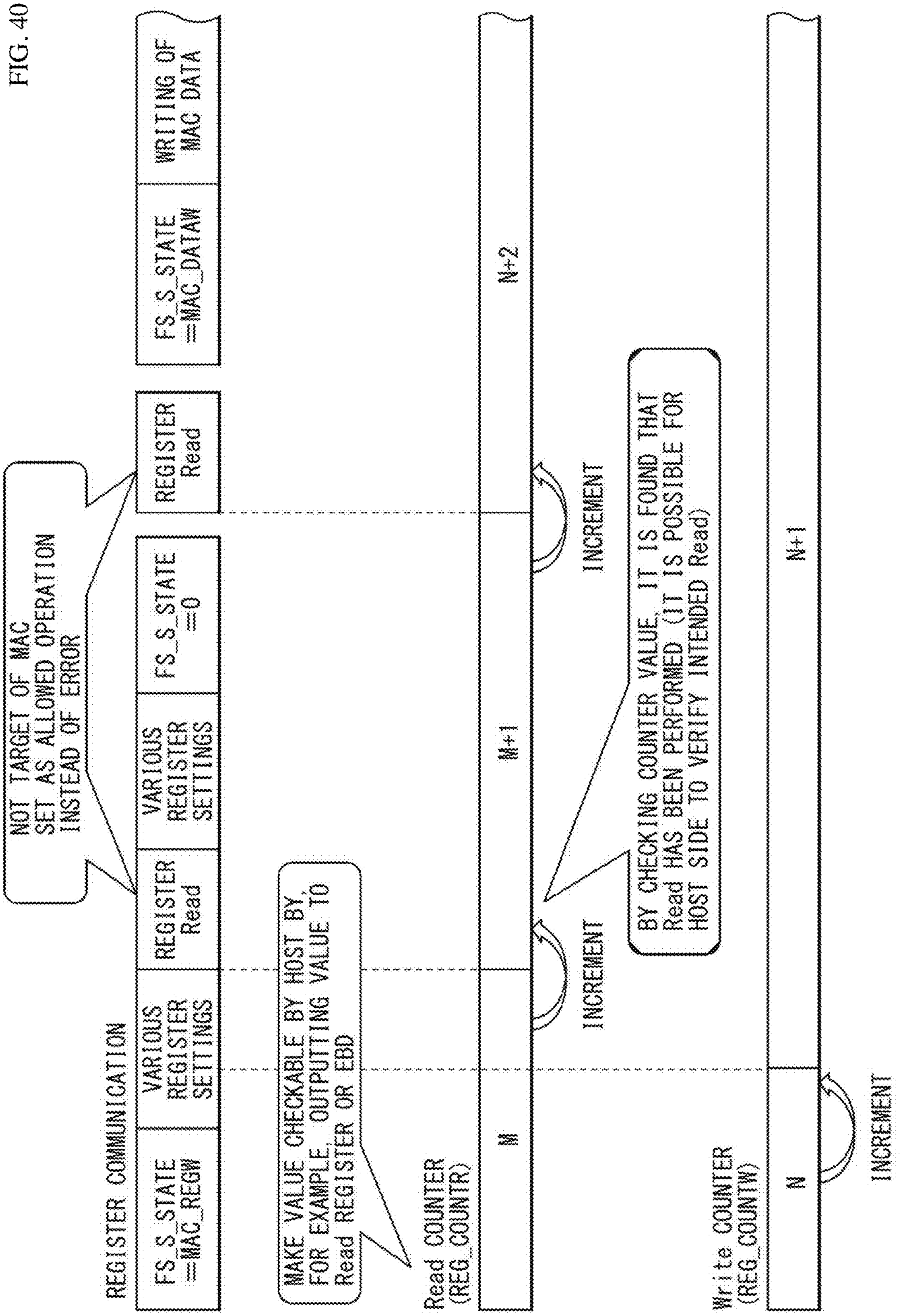
FIG. 40 is a sequence diagram illustrating an example of register communication including operation of the Read counter and the Write counter based on the technology according to one embodiment.

FIG. 40 is a sequence diagram illustrating an example of the register communication including operation of the Read counter and the Write counter based on the technology according to the embodiment. FIG. 40 illustrates an example of the register communication in a case of writing the setting information to the sensor register 311 in the MAC mode.

The CIS 1 may be configured to perform reading processing (register Read) of the setting information different from the setting information to be written from the sensor register 311, within a writing processing period of the setting information to the sensor register 311 based on a writing request (e.g., FS_S_STATE=MAC_REGW) from the host 2.

The CIS 1 may be configured such that, during processing related to register writing, reading from the register 130 that allows for normal reading is available and does not influence data of writing processing (the MAC value or the CRC value is calculated for only writing processing). This makes it possible for the host 2 to, for example, check the state information in the register 130, during the processing related to register writing.

For example, after writing of the setting value to the register 130 in the CRC mode or the MAC mode, before writing of the CRC data or the MAC data, normal reading of the register value during writing processing may be set as an allowed operation instead of an error. This assumes, for example, state reading for polling of a functional safety and security error or another state register. In addition, this assumes specifications of only the register region where normal reading is available. As for reading from the register 130 designated as a region where reading is not available without CRC, MAC, or encryption, error detection may be performed and the value may be prevented from being outputted.

[1.3 Effects]

As described above, according to the data transmission system according to the embodiment, the functional safety and security data region 313 that stores the security data for the setting information and the communication information register 312 that stores the communication information with the host 2 are included, as the address regions of the register 130 in the CIS 1 serving as the data processing device, and the register communication is performed between the CIS 1 and the host 2. This makes it possible to improve security.

In addition, the data transmission system according to the embodiment makes it possible to implement a safety and security function implementable within a range of an existing standard or specifications of an existing communication IF. It is possible to implement safety and security of the communication IF by a highly flexible change of the upper layers 113 and 213 implementable by software or the like.

This makes it possible to incorporate security at a hardware level at a development timing of each of the CIS 1 and the host 2.

It is to be noted that the effects described in the present specification are merely illustrative and non-limiting, and other effects may be provided. The same applies to effects of the following other embodiments.

2. Other Embodiments

The technology according to the present disclosure is not limited to description of the embodiments described above, and may be modified in a variety of ways.

For example, the present technology may have the following configurations. According to the present technology with the following configurations, the security data region that stores the security data for the setting information and the communication information region that stores the communication information with the host are included, as the address regions of the register in the data processing device, and the register communication is performed between the data processing device and the host.

This makes it possible to improve security.

(1)

A data processing device including:

a register including, as address regions, a setting region that stores setting information transmitted from a host, a security data region that stores security data for the setting information, and a communication information region that stores communication information with the host; and a communication unit that performs register communication between the host and the register.

(2)

The data processing device according to (1), in which the communication information includes communication mode information indicating a communication mode of the register communication, status information indicating a communication start of the register communication, and status information indicating a communication end of the register communication.

(3)

The data processing device according to (1) or (2), in which the security data includes at least one of encrypted data including the setting information, an error detection code related to the setting information, or a message authentication code related to the setting information.

(4)

The data processing device according to any one of (1) to (3), further including a notification unit that outputs, as notification information, at least one of a processing status indicating a processing state in the register or error information caused in processing in the register.

(5)

The data processing device according to (4), further including:

a processing state output terminal that outputs the processing status to the host; and an error output terminal that outputs the error information to the host.

(6)

The data processing device according to (4) or (5), further including:

a sensor unit; and a data output unit that adds the notification information from the notification unit to sensor data outputted from the sensor unit and outputs the sensor data to the host.

(7)

The data processing device according to any one of (1) to (6), in which the data processing device is configured to perform communication in multiple communication modes between the host and the register, and configured to select in which communication mode of the multiple communication modes the register communication is to be performed.

(8)

The data processing device according to (2), in which, in a case of performing register communication in a second communication mode after performing register communication in a first communication mode, the data processing device is configured to omit the status information indicating the communication end of the register communication in the first communication mode.

(9)

The data processing device according to any one of (1) to (8), further including a decryption unit that decrypts encrypted data, in which the data processing device writes encrypted data including the setting information to the security data region, and thereafter performs decryption on the encrypted data with use of the decryption unit and writes the setting information obtained by the decryption to the setting region.

(10)

The data processing device according to any one of (1) to (9), in which, in a case where a reading request for the setting information is made from the host, the data processing device reads the setting information stored in the setting region, and the security data related to the setting information and stored in the security data region.

(11)

The data processing device according to any one of (1) to (10), in which, in a case where a reading request for the setting information by encryption is made from the host, the data processing device encrypts the setting information stored in the setting region and writes the encrypted setting information as encrypted data to the security data region, and thereafter reads the encrypted data from the security data region.

(12)

The data processing device according to any one of (1) to (11), further including a communication counter including a writing counter that counts that a writing request for the setting information to the setting region has been made from the host, and a reading counter that counts that a reading request for the setting information has been made from the host.

(13)

The data processing device according to (12), further including:

a sensor unit; and a data output unit that adds a counter value from the communication counter to sensor data outputted from the sensor unit and outputs the sensor data to the host, in which the data output unit adds the counter value from the communication counter to the sensor data, at a timing synchronized with a synchronization timing signal for the sensor data.

(14)

The data processing device according to (13), further including a notification unit that outputs, as notification information, at least one of a processing status indicating a processing state in the register or error information caused in processing in the register, in which the data output unit adds the notification information from the notification unit and the counter value from the communication counter to the sensor data, at the timing synchronized with the synchronization timing signal for the sensor data.

(15)

The data processing device according to any one of (1) to (14), in which the setting region includes a security target region for predetermined security processing, and the data processing device is configured to permit writing of the setting information to the security target region or reading of the setting information from the security target region, in a case of performing the predetermined security processing.

(16)

The data processing device according to any one of (12) to (14), in which, in a case where the register communication in which the communication information is not set is performed between the host and the register, the data processing device is configured not to reflect writing of the setting information to the setting region.

(17)

The data processing device according to any one of (12) to (14), in which the setting information transmitted from the host includes a counter expected value for a counter value of the writing counter, and the register includes an expected value register that stores the counter expected value.

(18)

The data processing device according to (17), further including:

a temporary storage unit that temporarily stores the setting information transmitted from the host; and a writing determination unit that performs correctness determination of the setting information stored in the temporary storage unit, on the basis of the security data, and reflects writing of the setting information in the setting region in a case where the setting information is determined as being correct and where the counter value of the writing counter and the counter expected value stored in the expected value register match.

(19)

The data processing device according to any one of (4) to (6), in which the notification unit outputs the error information as the notification information, in a case where correctness determination of the setting information is performed on the basis of the security data and the setting information is determined as being incorrect.

(20)

The data processing device according to (17) or (18), further including a notification unit that outputs error information as notification information, in a case where the counter value of the writing counter and the counter expected value stored in the expected value register do not match.

(21)

The data processing device according to any one of (1) to (20), in which the data processing device is configured to switch whether or not to use the security data region and the communication information region in the register.

(22)

The data processing device according to any one of (1) to (21), further including a writing determination unit that, after writing of the setting information is reflected in the setting region, performs correctness determination of the setting information reflected in the setting region, on the basis of the security data.

(23)

The data processing device according to (6), in which the data output unit adds the notification information from the notification unit to the sensor data, at a timing synchronized with a synchronization timing signal for the sensor data.

(24)

The data processing device according to any one of (1) to (23), further including:

a temporary storage unit that temporarily stores the setting information transmitted from the host; and a writing determination unit that performs correctness determination of the setting information stored in the temporary storage unit, on the basis of the security data, and reflects writing of the setting information in the setting region in a case where the setting information is determined as being correct.

(25)

The data processing device according to any one of (12) to (14), in which the writing counter increments a counter value at a timing when register communication indicating the writing request is detected.

(26)

The data processing device according to any one of (12) to (14), in which the reading counter increments a counter value at a timing of starting reading of the setting information corresponding to the reading request.

(27)

The data processing device according to any one of (12) to (14), in which, in a case where the reading request by encryption is made, the reading counter increments a counter value after the setting information stored in the setting region is encrypted and written as encrypted data to the security data region, before the encrypted data is read from the security data region.

(28)

The data processing device according to any one of (12) to (14), in which, in a case where the register communication in which the communication information is not set is performed between the host and the register, the data processing device increments a counter value of the communication counter in communication transfer units of the register communication.

(29)

The data processing device according to any one of (1) to (28), in which, before writing or reading the setting information to or from the setting region, communication mode information including information regarding an algorithm corresponding to desired security processing is transmitted as the communication information from the host.

(30)

The data processing device according to (29), in which information indicating that the communication information includes the communication mode information is transmitted from the host.

(31)

The data processing device according to (29) or (30), in which, before the communication information is transmitted from the host, information to be used for the desired security processing is transmitted from the host, and the data processing device writes the information to be used for the desired security processing to the security data region as the security data.

(32)

The data processing device according to any one of (4) to (6), in which the notification unit outputs the error information as the notification information, in a case where the register communication that is unintended and in which the communication information is not set is performed between the host and the register.

(33)

The data processing device according to any one of (4) to (6), in which the notification unit outputs the error information as the notification information, in a case where the register communication based on an unintended command different from a command indicated by the communication information is performed between the host and the register.

(34)

The data processing device according to any one of (4) to (6), in which the notification unit outputs the error information as the notification information, in a case where a command is not transmitted by the register communication from the host within a predetermined period.

(35)

The data processing device according to any one of (1) to (34), in which the data processing device is configured to perform reading processing of setting information different from the setting information to be written from the setting region, within a writing processing period of the setting information to the setting region based on a writing request from the host.

(36)

A data transmission system including:

a host; and a data processing device, in which the data processing device includes a register including, as address regions, a setting region that stores setting information transmitted from the host, a security data region that stores security data for the setting information, and a communication information region that stores communication information with the host, and a communication unit that performs register communication between the host and the register.

This application claims the benefit of Japanese Priority Patent Application JP 2021-209756 filed with the Japan Patent Office on Dec. 23, 2021, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A data processing device comprising:

a register including, as address regions, a setting region that stores setting information transmitted from a host, a security data region that stores security data for the setting information, and a communication information region that stores communication information with the host a communication circuit that performs register communication between the host and the register;

a communication counter including a writing counter that counts that a writing request for the setting information to the setting region has been made from the host, and a reading counter that counts that a reading request for the setting information has been made from the host;

a sensor;

a data output circuit that adds a counter value from the communication counter to sensor data outputted from the sensor and outputs the sensor data to the host, wherein the data output circuit adds the counter value from the communication counter to the sensor data, at a timing synchronized with a synchronization timing signal for the sensor data;

a notification circuit that outputs, as notification information, at least one of a processing status indicating a processing state in the register or error information caused in processing in the register;

a processing state output terminal that outputs the processing status to the host; and an error output terminal that outputs the error information to the host.

2. The data processing device according to claim 1, wherein the communication information includes communication mode information indicating a communication mode of the register communication, status information indicating a communication start of the register communication, and status information indicating a communication end of the register communication.

3. The data processing device according to claim 1, wherein the security data includes at least one of encrypted data including the setting information, an error detection code related to the setting information, or a message authentication code related to the setting information.

4. A data processing device comprising:

a register including, as address regions, a setting region that stores setting information transmitted from a host, a security data region that stores security data for the setting information, and a communication information region that stores communication information with the host a communication circuit that performs register communication between the host and the register;

a communication counter including a writing counter that counts that a writing request for the setting information to the setting region has been made from the host, and a reading counter that counts that a reading request for the setting information has been made from the host;

a sensor;

a data output circuit that adds a counter value from the communication counter to sensor data outputted from the sensor and outputs the sensor data to the host, wherein the data output circuit adds the counter value from the communication counter to the sensor data, at a timing synchronized with a synchronization timing signal for the sensor data; and a notification circuit that outputs, as notification information, at least one of a processing status indicating a processing state in the register or error information caused in processing in the register, wherein the data output circuit adds the notification information from the notification circuit to the sensor data outputted from the sensor and outputs the sensor data to the host.

5. The data processing device according to claim 1, wherein the data processing device is configured to perform communication in multiple communication modes between the host and the register, and configured to select in which communication mode of the multiple communication modes the register communication is to be performed.

6. The data processing device according to claim 2, wherein, in a case of performing register communication in a second communication mode after performing register communication in a first communication mode, the data processing device is configured to omit the status information indicating the communication end of the register communication in the first communication mode.

7. The data processing device according to claim 1, further comprising:

a decryption circuit that decrypts encrypted data, wherein the data processing device writes encrypted data including the setting information to the security data region, and thereafter performs decryption on the encrypted data with use of the decryption circuit and writes the setting information obtained by the decryption to the setting region.

8. The data processing device according to claim 1, wherein, in a case where a reading request for the setting information is made from the host, the data processing device reads the setting information stored in the setting region, and the security data related to the setting information and stored in the security data region.

9. The data processing device according to claim 1, wherein, in a case where a reading request for the setting information by encryption is made from the host, the data processing device encrypts the setting information stored in the setting region and writes the encrypted setting information as encrypted data to the security data region, and thereafter reads the encrypted data from the security data region.

10. The data processing device according to claim 1, further comprising:

a notification circuit that outputs, as notification information, at least one of a processing status indicating a processing state in the register or error information caused in processing in the register, wherein the data output circuit adds the notification information from the notification circuit and the counter value from the communication counter to the sensor data, at the timing synchronized with the synchronization timing signal for the sensor data.

11. The data processing device according to claim 1, wherein the setting region includes a security target region for predetermined security processing, and the data processing device is configured to permit writing of the setting information to the security target region or reading of the setting information from the security target region, in a case of performing the predetermined security processing.

12. The data processing device according to claim 1, wherein, in a case where the register communication in which the communication information is not set is performed between the host and the register, the data processing device is configured not to reflect writing of the setting information to the setting region.

13. The data processing device according to claim 1, wherein the setting information transmitted from the host includes a counter expected value for a counter value of the writing counter, and the register includes an expected value register that stores the counter expected value.

14. A data processing device comprising:

a register including, as address regions, a setting region that stores setting information transmitted from a host, a security data region that stores security data for the setting information, and a communication information region that stores communication information with the host;

a communication circuit that performs register communication between the host and the register;

a communication counter including a writing counter that counts that a writing request for the setting information to the setting region has been made from the host, and a reading counter that counts that a reading request for the setting information has been made from the host;

a sensor;

a data output circuit that adds a counter value from the communication counter to sensor data outputted from the sensor and outputs the sensor data to the host, wherein the data output circuit adds the counter value from the communication counter to the sensor data, at a timing synchronized with a synchronization timing signal for the sensor data, the setting information transmitted from the host includes a counter expected value for a counter value of the writing counter, and the register includes an expected value register that stores the counter expected value;

a memory that temporarily stores the setting information transmitted from the host; and a writing determination circuit that performs correctness determination of the setting information stored in the memory, on a basis of the security data, and reflects writing of the setting information in the setting region in a case where the setting information is determined as being correct and where the counter value of the writing counter and the counter expected value stored in the expected value register match.

15. A data processing device comprising:

a register including, as address regions, a setting region that stores setting information transmitted from a host, a security data region that stores security data for the setting information, and a communication information region that stores communication information with the host; a communication circuit that performs register communication between the host and the register;

a communication counter including a writing counter that counts that a writing request for the setting information to the setting region has been made from the host, and a reading counter that counts that a reading request for the setting information has been made from the host;

a sensor;

a data output circuit that adds a counter value from the communication counter to sensor data outputted from the sensor and outputs the sensor data to the host, wherein the data output circuit adds the counter value from the communication counter to the sensor data, at a timing synchronized with a synchronization timing signal for the sensor data; and a notification circuit that outputs, as notification information, at least one of a processing status indicating a processing state in the register or error information caused in processing in the register, wherein the notification circuit outputs the error information as the notification information, in a case where correctness determination of the setting information is performed on a basis of the security data and the setting information is determined as being incorrect.

16. A data processing device comprising:

a register including, as address regions, a setting region that stores setting information transmitted from a host, a security data region that stores security data for the setting information, and a communication information region that stores communication information with the host;

a communication circuit that performs register communication between the host and the register;

a communication counter including a writing counter that counts that a writing request for the setting information to the setting region has been made from the host, and a reading counter that counts that a reading request for the setting information has been made from the host;

a sensor;

a data output circuit that adds a counter value from the communication counter to sensor data outputted from the sensor and outputs the sensor data to the host, wherein the data output circuit adds the counter value from the communication counter to the sensor data, at a timing synchronized with a synchronization timing signal for the sensor data, the setting information transmitted from the host includes a counter expected value for a counter value of the writing counter, and the register includes an expected value register that stores the counter expected value; and a notification circuit that outputs error information as notification information, in a case where the counter value of the writing counter and the counter expected value stored in the expected value register do not match.

* * * * *